United States Patent
McGowan et al.

(10) Patent No.: US 8,280,987 B2
(45) Date of Patent: Oct. 2, 2012

(54) CLOUD DATA PERSISTENCE ENGINE

(75) Inventors: Albert J. McGowan, Phoenix, AZ (US); Richard L. Carls, Scottsdale, AZ (US)

(73) Assignee: Unicorn Media, Inc., Tempe, AZ (US)

( * ) Notice: Subject to any disclaimer, the term of this patent is extended or adjusted under 35 U.S.C. 154(b) by 0 days.

(21) Appl. No.: 13/017,866

(22) Filed: Jan. 31, 2011

(65) Prior Publication Data

US 2012/0030313 A1      Feb. 2, 2012

(30) Foreign Application Priority Data

Jul. 1, 2010   (AU) .................................. 2010202782

(51) Int. Cl.
*G06F 15/16*   (2006.01)

(52) U.S. Cl. ........ 709/219; 709/220; 709/221; 709/222; 709/223; 709/224; 709/225

(58) Field of Classification Search ........................ None
See application file for complete search history.

(56) References Cited

U.S. PATENT DOCUMENTS

| | | | | |
|---|---|---|---|---|
| 5,852,717 A * | 12/1998 | Bhide et al. | ................... | 709/203 |
| 6,405,240 B1 * | 6/2002 | Tsubone et al. | .............. | 709/203 |
| 7,373,394 B1 * | 5/2008 | Li et al. | ........................... | 709/219 |
| 7,516,194 B1 * | 4/2009 | Lamkins et al. | .............. | 709/218 |
| 7,613,815 B1 * | 11/2009 | Prakash et al. | ................ | 709/230 |
| 7,716,282 B2 * | 5/2010 | Takeshima et al. | ........... | 709/203 |
| 7,809,840 B2 * | 10/2010 | Jing et al. | ........................ | 709/227 |
| 7,921,116 B2 * | 4/2011 | Finkelstein et al. | ......... | 707/746 |
| 7,953,820 B2 * | 5/2011 | Stevens et al. | ................ | 709/219 |
| 2003/0061272 A1 | 3/2003 | Krishnamurthy et al. | | |
| 2005/0044242 A1 * | 2/2005 | Stevens et al. | ................. | 709/228 |
| 2006/0265427 A1 * | 11/2006 | Cohen et al. | ................... | 707/200 |
| 2007/0083537 A1 * | 4/2007 | Martinez | ....................... | 707/101 |
| 2007/0294295 A1 * | 12/2007 | Finkelstein et al. | ........ | 707/104.1 |
| 2008/0294748 A1 * | 11/2008 | Brown et al. | .................. | 709/219 |
| 2010/0287159 A1 * | 11/2010 | Abajian et al. | ................ | 707/723 |
| 2011/0016197 A1 * | 1/2011 | Shiimori et al. | ............... | 709/219 |
| 2011/0029883 A1 * | 2/2011 | Lussier et al. | ................ | 715/738 |
| 2012/0005276 A1 * | 1/2012 | Guo et al. | ....................... | 709/206 |
| 2012/0030317 A1 * | 2/2012 | Smyth et al. | ................... | 709/219 |

OTHER PUBLICATIONS

Chang, F., et al., "Bigtable: A Distributed Storage System for Structured Data," [online], Google Inc., Nov. 2006, [Retrieved from the Internet on Jul. 28, 2011], Retrieved from: http://labs.google.com/papers/bigtable.html, 14 pages.

* cited by examiner

*Primary Examiner* — Backhean Tiv
(74) *Attorney, Agent, or Firm* — Kilpatrick Townsend & Stockton LLP

(57) ABSTRACT

Various cloud data persistence systems and methods are described. In some embodiments, a client may request a data object from a server. This data object may contain a link to a media asset and other information linked to the video file, such as a title and duration. This media asset may be stored in a different location. If this first server does not have the data object stored locally, it may contact a second server to determine if it has the data object stored. If the second server does not have the data object stored, it may contact a data object origin server, which may have all existing data objects stored. This data object origin server may then send the data object to the second server, which may in turn transmit the data object to the first server. The first server may then transmit the data object to the client.

20 Claims, 14 Drawing Sheets

CLOUD DATA PERSISTENCE ENGINE

CROSS-REFERENCE TO RELATED APPLICATION

This application claims priority to Australian Patent Application Serial No. 2010202782, filed Jul. 1, 2010, entitled "CLOUD DATA PERSISTENCE ENGINE," which is incorporated herein by reference for all purposes.

BACKGROUND OF THE INVENTION

This disclosure relates in general to cloud-based computer processing and, but not by way of limitation, to distribution, storage, and retrieval of data on a cloud networking arrangement.

In a typical data hosting architecture, multiple servers may be spread over a geographical area. The data stored on each of these servers may be the same (or substantially similar) data as that stored on each other server. A client attempting to access data hosted on such a system may communicate with a particular server, often the server closest to the client's physical location.

While such an arrangement may allow the client to quickly access all data stored on the server system, it may not be efficient for all data to be stored on each server. Clients in different locations (e.g., different cities, states, countries, and/or continents) may request data that varies significantly by location. For example, particular data may frequently be requested by clients in Europe, while the same data may be infrequently requested by clients in the Americas. Therefore, if all of the data is maintained at each server, such a system may result in significant quantities of data being stored at servers where the data is infrequently, if at all, accessed. Accordingly, such a system may result in a substantial amount of data being stored at servers that wastes storage resources and is infrequently accessed.

BRIEF SUMMARY OF THE INVENTION

Various cloud data persistence systems and methods are described. In some embodiments, a client may request a data object from a server. This data object may contain a link to a media asset and other information linked to the video file, such as a title and duration. This media asset may be stored in a different location. If this first server does not have the data object stored locally, it may contact a second server to determine if it has the data object stored. If the second server does not have the data object stored, it may contact a data object origin server, which may have all existing data objects stored. This data object origin server may then send the data object to the second server, which may in turn transmit the data object to the first server. The first server may then transmit the data object to the client.

In some embodiments, a cloud data persistence system for distribution of data is present. The system may include a first server which stores a first plurality of data objects and is communicatively coupled with a plurality of cache servers. The first server may be located at a first location. Each of the first plurality of data objects may comprise a link to one of a plurality of media assets. The plurality of media assets may be stored at a second location separate from the first location. The system may include a second server that stores a second plurality of data objects and is configured to request a data object from the first server if the data object is not present in the second plurality of data objects. The second server may be one of the plurality of cache servers. The second server may be communicatively coupled with a first plurality of application servers. The system may include a third server that stores a third plurality of data objects and is configured to request the data object from the first server if the data object is not present in the third plurality of data objects. The third server may be one of the plurality of cache servers. The third server may be communicatively coupled with a second plurality of application servers. The system may include a fourth server that stores a fourth plurality of data objects and is configured to request the data object from the second server if the data object is not present in the fourth plurality of data objects. The fourth server may be one of the first plurality of application server. The fourth server may be configured to receive a request from a first client for the data object. The system may also include a fifth server that stores a fifth plurality of data objects and is configured to request the data object from the second server if the data object is not present in the fifth plurality of data objects. The fifth server may be one of the first plurality of application servers. The fifth server may be configured to receive a request from a second client for the data object. The system may further include a sixth server that stores a sixth plurality of data objects and is configured to request the data object from the third server if the data object is not present in the sixth plurality of data objects. The sixth server may be one of the second plurality of application servers. The sixth server may be configured to receive a request from a third client for the data object. The system may include a seventh server that stores a seventh plurality of data objects and is configured to request the data object from the third server if the data object is not present in the seventh plurality of data objects. The seventh server may be one of the second plurality of application servers. The seventh server may be configured to receive a request from a fourth client for the data object.

In some embodiments, a method for retrieving data objects using a cloud data persistence system configured for distribution of data is presented. The method may include receiving a first request from a client for a data object. The application center may be one of a plurality of application centers that communicate with a plurality of clients. The application center may be located at a first location. The data object may comprise a link to a media asset. The media asset may be stored at a second location separate from the first location. The method may further include determining the data object is not stored among a first plurality of data objects stored at the application center. The method may include transmitting a second request for the data object to a first cache server. The first cache server may be communicatively coupled with the plurality of application centers. The first cache server may be one of a plurality of cache servers. The method may include receiving the second request for the data object. The method may also include determining the data object is not stored among a second plurality of data objects stored at the cache server. The method may further include transmitting a third request for the data object to an origin server. The origin server may be communicatively coupled with the plurality of cache servers. The method may also include receiving the third request for the data object. The method may include locating the data object among a third plurality of data objects. The method may also include transmitting the data object linked to the third request to the cache server. The method may include receiving the data object linked to the third request. The method may include transmitting the data object linked to the second request. Also, the method may include receiving the data object linked to the second request. Further, the method may include transmitting the data object linked to the first request to the client.

In some embodiments, a cloud data persistence system for distribution of data is present. The system includes a first server which stores a first plurality of data objects and is communicatively coupled with a second server and a third server. The first server may be located at a first location. Each of the first plurality of data objects may comprise a link to a media asset of a plurality of media assets. The plurality of media assets may be located at a second location. The second location may be distinct from the first location. The system may include the second server, which may store a second plurality of data objects and may be configured to request a data object from the first server if the data object is not present in the second plurality of data objects. The second server may be communicatively coupled with a fourth server and fifth server. The system may include the fourth server that stores a third plurality of data objects and may be configured to request the data object from the second server if the data object is not present in the third plurality of data objects. The fourth server may be configured to receive a request from a first client for the data object.

In some embodiments, the first plurality of data objects comprises all data objects present in the second plurality of data objects and the third plurality of data objects. In some embodiments, the third server stores a fourth plurality of data objects and is configured to request the data object from the first server if the data object is not present in the fourth plurality of data objects. The third server and the second server may be data persistence cache servers. The third server may be communicatively coupled with a sixth and seventh server. In some embodiments, the fifth server stores a fifth plurality of data objects and is configured to request the data object from the second server if the data object is not present in the fifth plurality of data objects. The fifth server and the fourth servers may be application servers. The fifth server may be configured to receive requests from a second client for the data object. The fifth server may be geographically separated from the fourth server. In some embodiments, the request from the first client for the data object comprises a universal resource indicator. In some embodiments, each of the first plurality of data objects comprise a universal resource locator and a title linked to a media asset of the plurality of media assets. Also, in some embodiments, data objects in the second plurality of data objects and the third plurality of data objects are at least partially determined based on a frequency of requests for those data objects received from clients. In some embodiments, data objects in the second plurality of data objects and the third plurality of data objects are at least partially determined based on when requests for those data objects were last received from clients. Further, in some embodiments, the first plurality of data objects comprises all data objects in the second plurality of data objects, the third plurality of data objects, the fourth plurality of data objects, and the fifth plurality of data objects.

BRIEF DESCRIPTION OF THE DRAWINGS

The present disclosure is described in conjunction with the appended figures.

Figure 1:
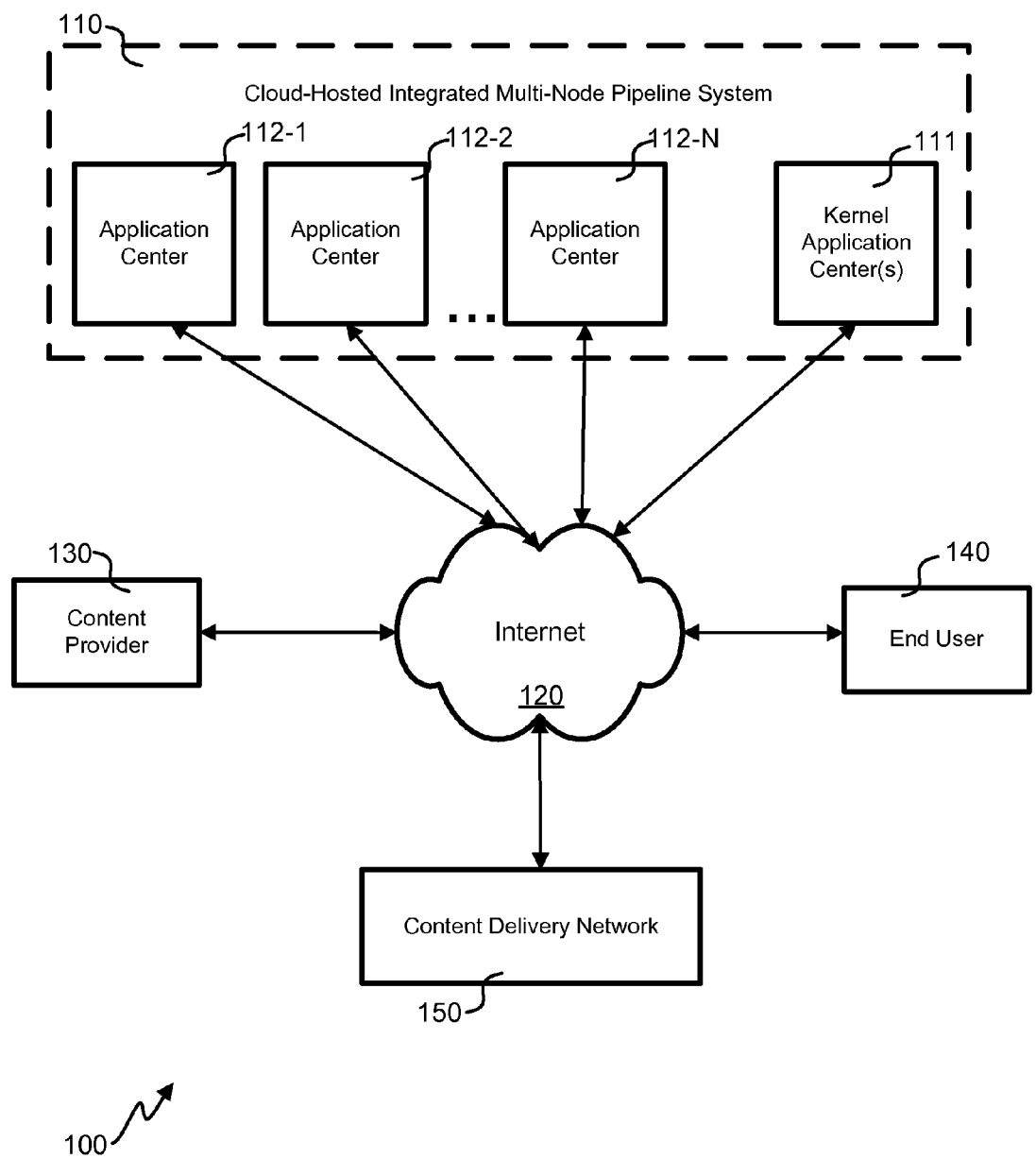
FIG. 1 illustrates a block diagram of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

As opposed to storing copies of a piece of data, such as a data object that contains information linked to a media object, at each server on a system of multiple servers, it may be more efficient to store only data objects that are frequently and/or recently accessed by clients at particular servers. Such an arrangement, generally referred to as a cloud data persistence engine or system, may allow the data objects stored at each server to vary based on which data objects the server's clients are currently and/or have historically requested. Therefore, data objects stored at a first server in a first location may include some of the same data objects and some different data objects than data objects stored at a second server in a second location (possibly located in a different city, country or on a different continent than the first server). Storing only data objects that are frequently and/or recently accessed by clients at each server may result in considerable efficiencies. For example, by storing only data objects that are frequently and/or recently accessed by clients, the servers may require significantly less storage space because they do not need to store a potentially large amount of data objects that are infrequently accessed or have not recently been accessed. A related benefit of this may be that by decreasing the amount of storage necessary at each server, the speed of access to the storage at the servers may be increased. For example, instead of relying on hard drives, solid state drives (which may cost significantly more per megabyte, but may offer improved access times) may be used for the storage at the servers.

While a server may infrequently receive a request for a particular data object from a client, the server may still need to be able to fulfill such a request. Therefore, if a server is contacted by a client for a data object that it does not have stored locally, the server may be able to contact another server, which may have the requested data object stored. Such a server may be configured to satisfy multiple servers with requests for such data objects.

While this second cache server may contain the data object requested by the client, it may also only store data objects that are frequently and/or recently (albeit less frequently and/or recently than the data stored at the first server) accessed by clients. If the second server does not have the data object requested by the client stored, the second server may have the ability to contact yet another server. This server, referred to as the data object origin server, may maintain a copy of all data objects stored on the system. Therefore, if the data object is present on the server system, the data object origin server is able to fulfill the request for the data. The data object origin server may then route the requested data to the client via the second server and the first server.

While the above arrangement may increase efficiencies when a client requests a data object, a client (perhaps the same or a different client) may request to modify (including, but not limited to changing, adding and/or deleting) a data object. In such instances, the modification to the data object (assuming the client has the appropriate access rights) may be routed to the data object origin server by a server receiving the request from the client. The modification may be applied to the relevant data at the data object origin server. The data object origin server may then send a notification to other servers, or only the cache servers that have the previous version of the data stored, that the previous version of the data is no longer valid. These servers may in turn send a notification to other associated servers, or only those servers that have the previous version of the data stored, that the previous version of the data object is no longer valid. This may prevent a client from receiving an out-of-date version of the data no matter which server is accessed by the client. The modified data residing at the origin may then propagate out to the other servers as requests are made by clients to those servers for the data object.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end user 140 (alternatively referred to as a user or a client) through a network such as the Internet 120. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user 140 with a more desirable playback experience.

End user 140 can request a media asset to hear and/or see with a client program running on a personal computer or other electronic device connected to Internet 120. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the CDN 150 or within the CHIMPS 150 itself. Location information may be provided by Universal Resource Indicator (URI), a Universal Resource Locator (URL) or other indicator. During playback of the media asset, the CHIMPS 150 can collect data regarding the playback through beaconing provided by a client program executed on a device operated by the end user 140 and/or indexing service from within the CHIMPS and/or CDN. The CHIMPS 150 can subsequently provide the data and/or any analytics information derived from the data to the content provider 130.

Figure 2A:
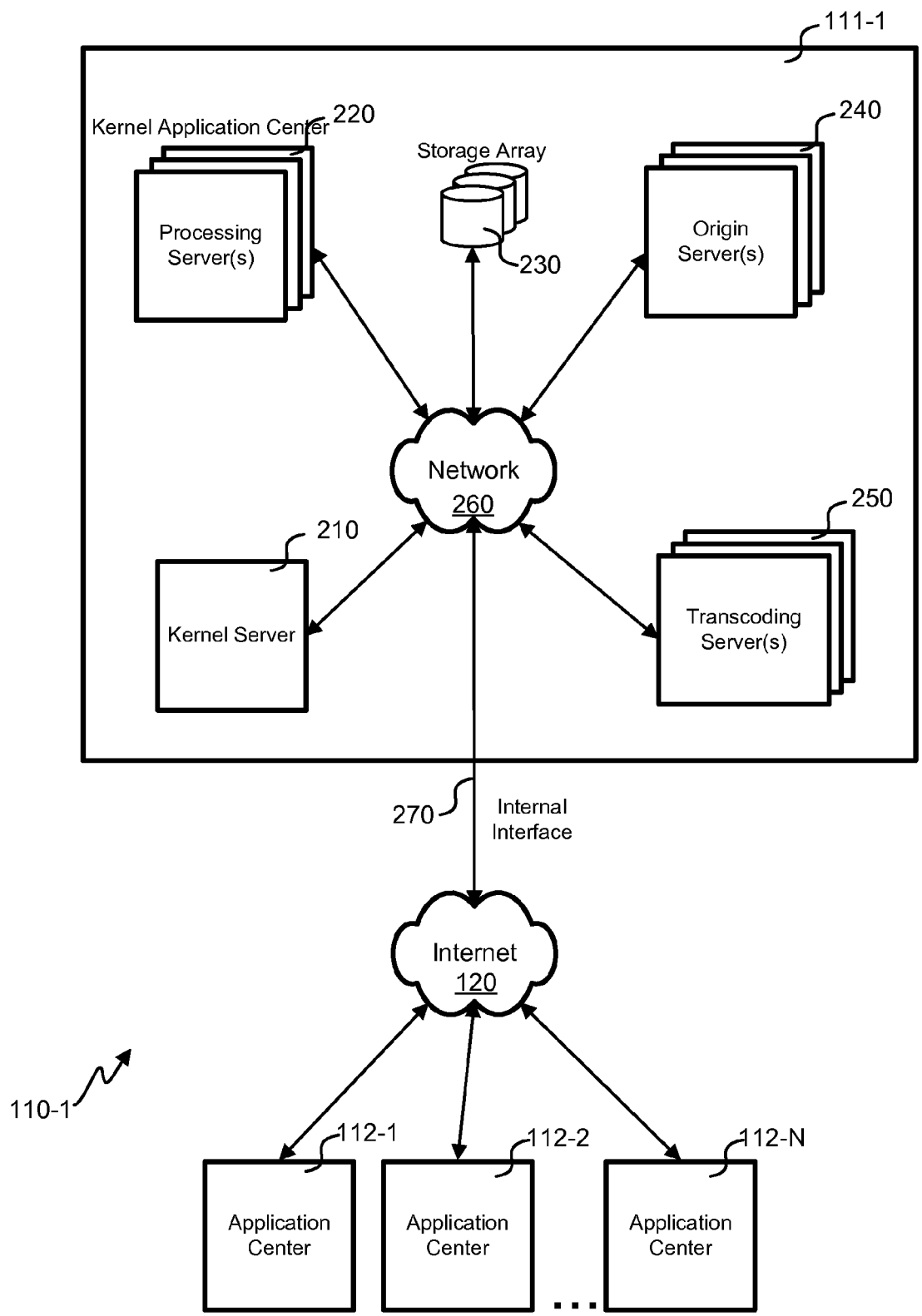
FIG. 2A illustrates a block diagram of an embodiment of a kernel application center connected with application centers.

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more data object origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a CDN and/or stored locally by storage array 230 and data object origin server(s) 240. Services running on the processing server(s) 220 can also update the associated data object stored by the storage array 230 and data object origin server(s) 240.

Figure 2B:
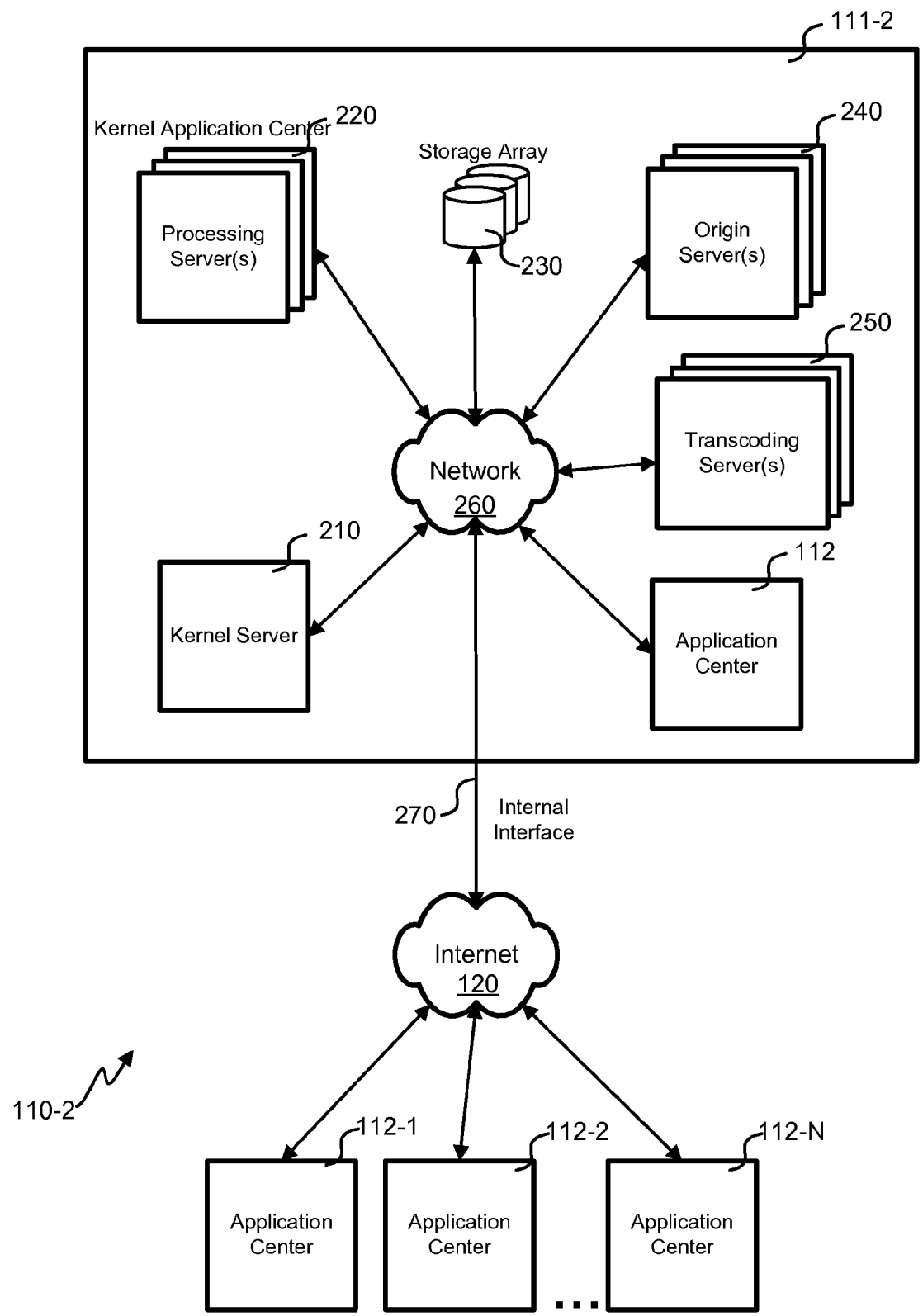
FIG. 2B illustrates a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
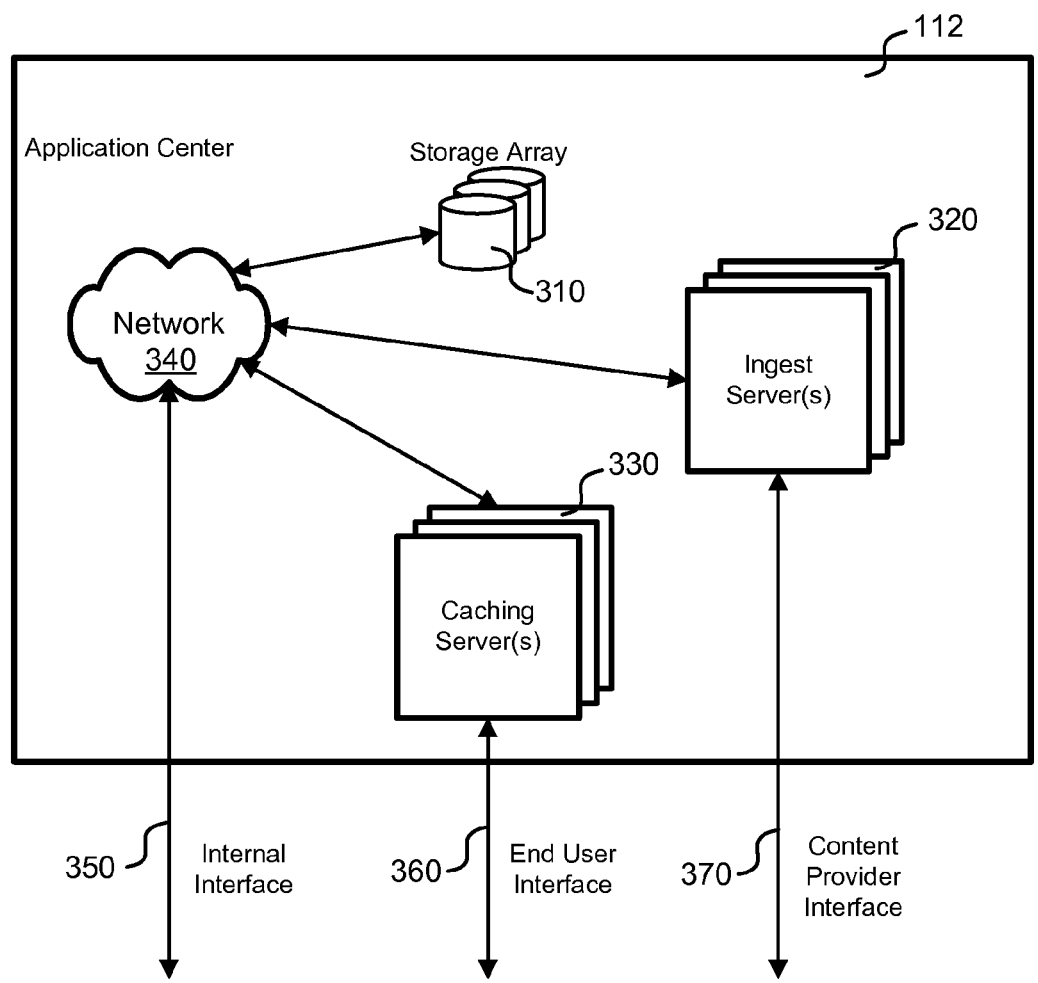
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end users through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media assets from a content provider 130 through a content provider interface 370. The media assets may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media assets stored on storage array 310 can be made available to a kernel application center 111 for services such as transcoding.

Figure 4A:
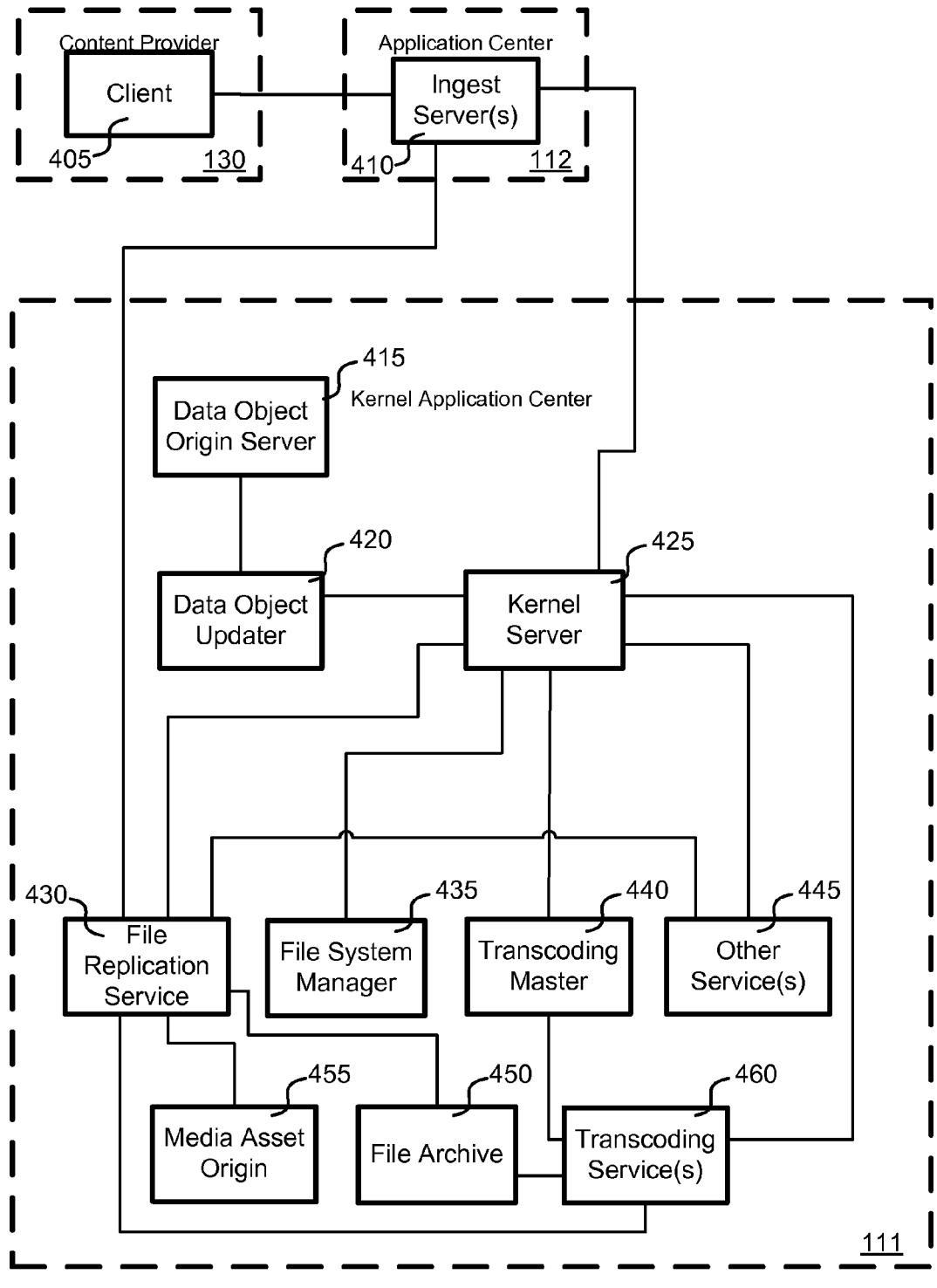
FIG. 4A illustrates a block diagram of processes and objects utilized by a cloud-hosted integrated multi-node pipelining system for media ingestion.

FIG. 4A is a block diagram 400-1 of processes and objects utilized by the CHIMPS 110 for media ingestion, according to some embodiments. Although FIG. 4A further indicates the physical systems in which my execute or store these processes and objects, it will be understood that the processes and objects disclosed may be executed or stored on more than one system, including systems not disclosed in FIG. 4A. In other words, the processes and objects shown in FIG. 4 allow for a variety of implementations through one or more of hardware, software, firmware, microcode, etc.

Media can be ingested into the CHIMPS 110 when a content provider 130 uploads a media asset to ingestion server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured to organize the workflow among services such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user who accesses the object in the data object origin 415 has the correct information regarding the related media asset. Because the data object updater 420 receives updates from the kernel server 425 (which is notified when a transcoded media asset is stored in the media asset origin 455, the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 425 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420, which updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased.

Figure 4B:
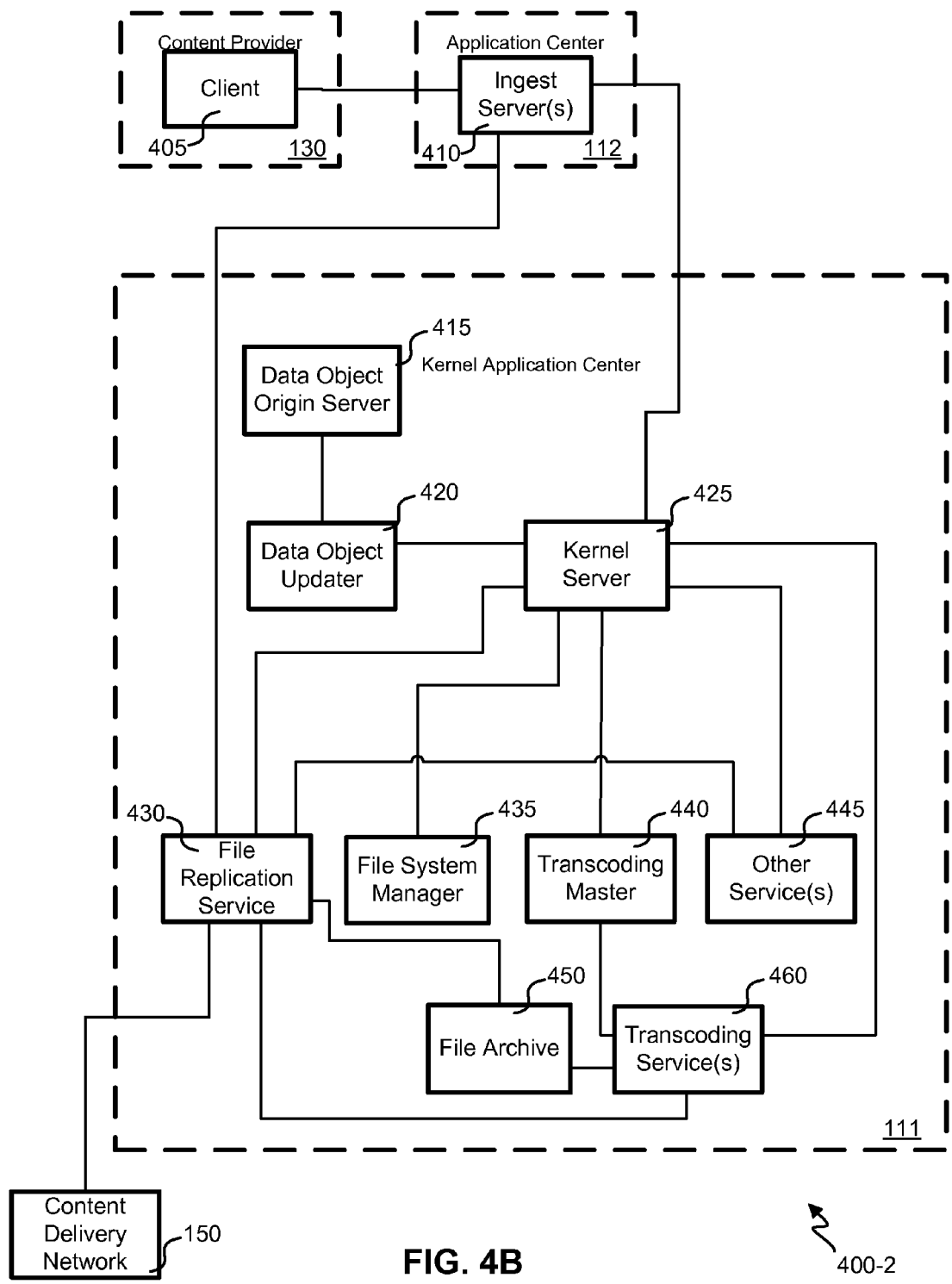
FIG. 4B illustrates a block diagram of processes and objects utilized by a cloud-hosted integrated multi-node pipelining system for media ingestion with a content delivery network.

FIG. 4B is a block diagram 400-2 of processes and objects utilized by the CHIMPS 110 for media ingestion, according to some embodiments. Block diagram 400-2 may be substantially similar to block diagram 400-1 except for the use of a content delivery network in place of media asset origin 455. Therefore, in block diagram 400-2, as opposed to the media assets being stored at media asset origin 455, they are stored at content data network 150, which may be operated and maintained by a third party.

Figure 4C:
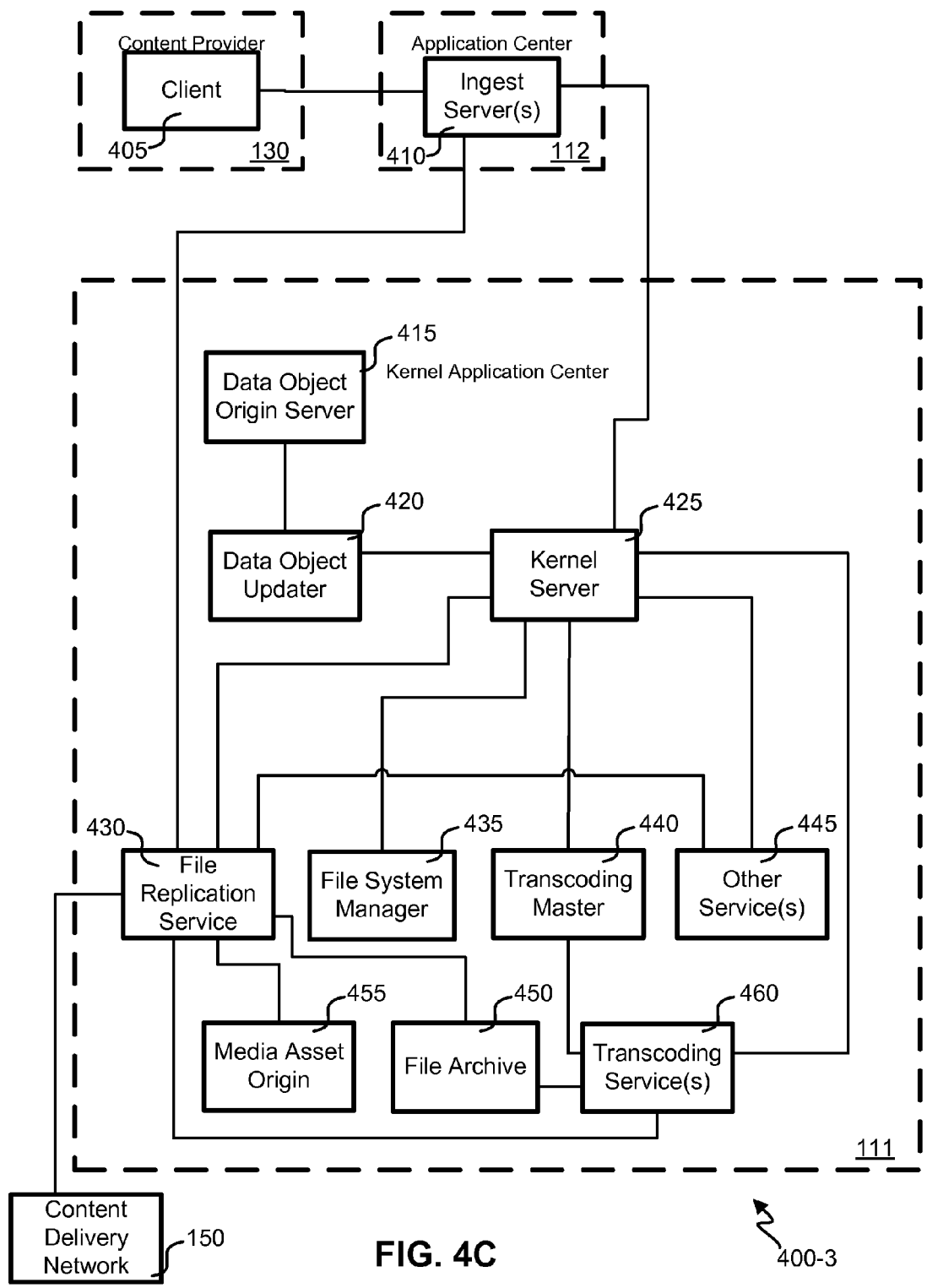
FIG. 4C illustrates another block diagram of processes and objects utilized by a cloud-hosted integrated multi-node pipelining system for media ingestion with a content delivery network.

FIG. 4C is a block diagram 400-3 of processes and objects utilized by the CHIMPS 110 for media ingestion, according to some embodiments. Block diagram 400-3 may be substantially similar to block diagram 400-1 except for the use of a content delivery network in conjunction with media asset origin 455. Here, in block diagram 400-3, media assets may reside at either media asset origin 455, content delivery network 150, or both.

Figure 5A:
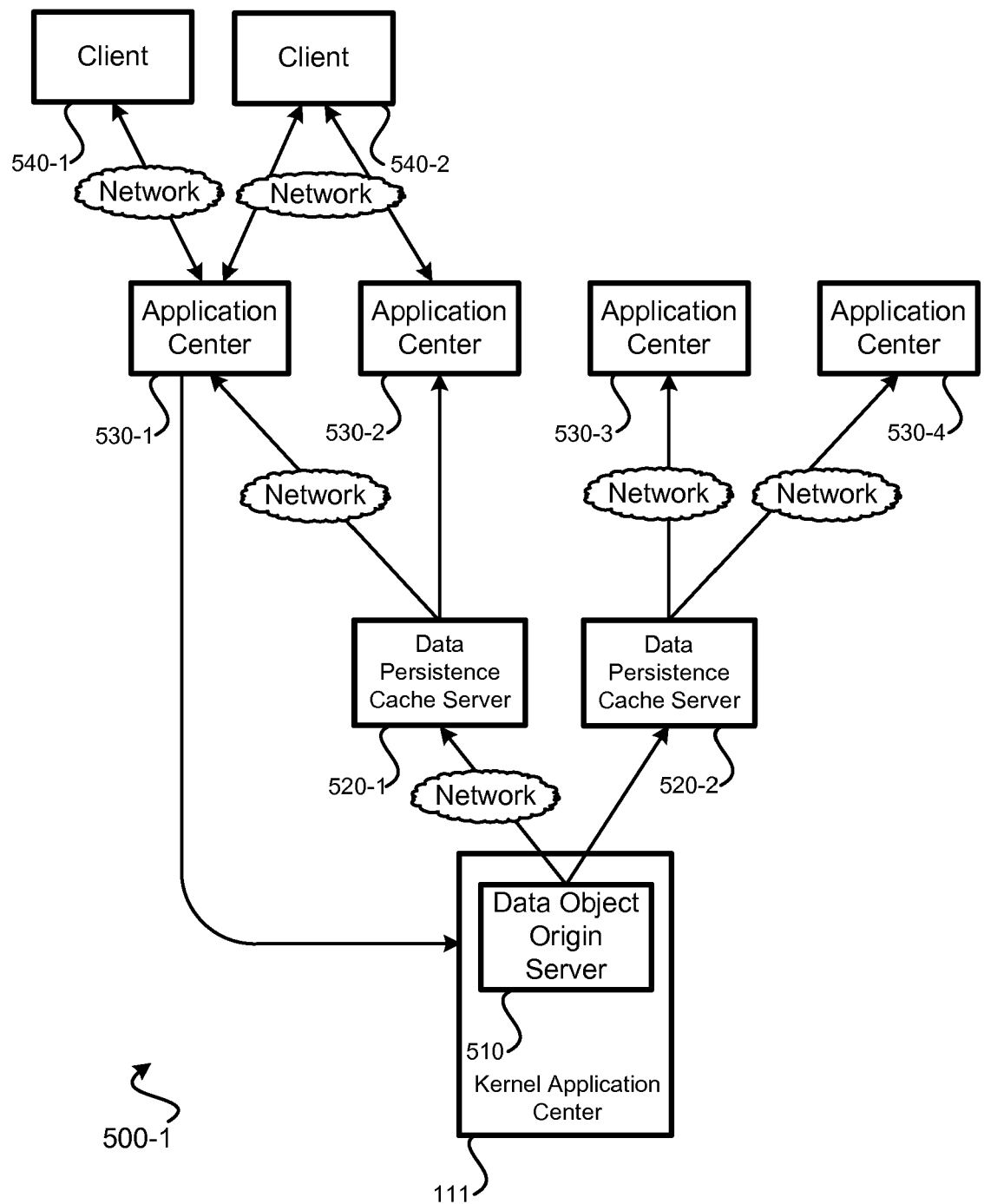
FIG. 5A illustrates a simplified block diagram of an embodiment of a cloud data persistence system.

Embodiments of such systems may include other systems that manage various requests from end users. One such system may be a cloud data persistence system. Referring to FIG. 5A, a simplified block diagram of an embodiment of a cloud data persistence system 500-1 is illustrated. Such a system may allow for information, such as data objects, to be efficiently distributed to multiple of clients.

Some embodiments of cloud data persistence systems are used to distribute data objects that are linked to media assets. A data object may contain information pertinent to the data object it is linked to. For example, a data object may include details about a media asset and permissions for the media asset. More specifically, a data object may include fields containing: a title, keywords linked to the data object, the data object's (and/or associated media asset's) date of creation, the duration of the associated media asset, the file formats the associated media asset is available in, and what clients are permitted to access and/or edit the data object and/or the media asset. The data object may also contain a link to its associated media asset. Such a link may be in the form of a universal resource indicator, such as a universal resource locator. Other information may also be stored as a data object that is linked to a media asset. A media asset may represent many different forms of media, such as an audio file (in a variety of different formats), a video file, or a flash file, to name only a few examples.

Important to note, data objects may be stored separate from media assets. For example, a data object containing information linked to a particular media asset may not be stored in the same location as the media asset. For example, a media asset may reside on multiple servers that are part of a content delivery network, while the data object that contains information about the media asset is stored in some other location, possibly on some other network. Also, while the above discusses linked media assets, it should be understood that data objects may also be linked to other assets, files or data that do not constitute media. In such embodiments, the data objects may contain different fields of data.

Such a cloud data persistence system may be used to distribute data objects to one or several clients, but also may be used to distribute data objects to thousands of clients geographically disbursed worldwide. In the embodiment of cloud data persistence system 500-1, three levels of servers are present: a data object origin server 510, data persistence cache servers 520, and application centers 530. These application centers are in contact with one or more clients 540. It should be understood that each application center may include one or more servers. For example, an application center may be represented by application center 112 of FIG. 3. Alternatively, an application center may comprise a single server. While three levels of servers are present in the illustrated embodiment, it should be understood that greater or fewer levels of servers may be present in other embodiments. Also, various servers may be integrated into the same server. For example, one server may serve as both an application center 530 and a data persistence cache server 520. It should also be understood that the terms of "application center," "data persistence cache server," and "data object origin server" are used to simplify the nomenclature used to describe the various levels of the cloud data persistence system 500-1, and these terms should not be interpreted as limiting the functionality of their respective identified servers.

Referring to cloud data persistence system 500-1, clients 540 make requests for data objects from application centers 530 via one or more networks. In the illustrated embodiment, only two clients (540-1 and 540-2) are present to maintain simplicity; many more clients (possibly representing many end users) may be possible. These clients may communicate with the same application center (530-1) or may communicate with different application centers (530-1 and 530-2). Further, because a client at one time interacts with a particular application center, at a different time, the same client may interact with a different application center. For example, if a particular application center is experiencing a heavy client load, possibly caused by a large number of clients attempting to access it, a client may be routed to another application center.

The client may make a request for a particular data object to the application center. This request may be made via a network, such as the Internet. Other networks may also be possible, such as a private intranet. The request for the data object may involve the client sending a universal resource indicator (URI) to an application center. A URI may take a variety of different formats. In particular, the URI may be in the form of a universal resource locator (URL). However, it should be understood that other forms of URIs may also be possible.

If client 540-1 transmits a URI to application center 530-1, application center 530-1 may have the data object linked to the URI stored locally. If this is the case, application center 530-1 may respond by sending the data object identified by the URI back to client 540-1. However, application center 530-1 may have only a subset of the data objects linked to valid URIs stored locally. This may be due to space constraints at application center 530-1. For example, if clients infrequently request particular data objects, it may be inefficient to distribute those data objects to each of application centers 530.

If the data object requested by client 540-1 is not present at application center 530-1, application center 530-1 may contact another server to retrieve it. Application center 530-1 may be located in close proximity to data persistence cache server 520-1, or may be geographically separated from data persistence cache server 520-1. Application center 530-1 may communicate with data persistence cache server 520-1 directly (such as a direct cable connection) or may communicate using a network. This network may be a private network, such as a local area network or dedicated connection between the servers, or may use a public network, such as the Internet. Such a request from application center 530-1 to data persistence cache server 520-1 may include the URI received by application center 530-1 from client 540-1. In some embodiments, data persistence cache servers supply multiple application centers with requested data objects. In cloud data persistence system 500-1, data persistence cache server 520-1 serves two application centers (530-1 and 530-2), while data persistence cache server 520-2 serves two different application centers (530-3 and 530-4). It should be understood that a data persistence cache may serve a varying number of application centers. For example, a data persistence cache may serve 20 application centers.

It should also be recognized that the connections between application centers 530 and data persistence cache servers 520 are dynamic. If a particular data persistence cache is offline, busy, or otherwise unavailable, an application center may be able to route requests to a different data persistence cache server. For example, referring to cloud data persistence system 500-1, if data persistence cache 520 became unavailable, application center 530-1 may be able to route a request for the data object to data persistence cache server 520-2.

While, if application centers 530 and data persistence caches 520 communicate via a network (e.g., the Internet), the servers may be located anywhere a network connection is available worldwide. In some embodiments, a data persistence cache is located near a group of application centers. For example, if a region, such as New England, contains two application centers for each state, a single data persistence cache may be located in or near New England to serve these twelve scattered application centers. Having the data persistence cache located near a group of application centers may decrease communication latency when an application center and the data persistence cache communicate.

Upon receiving a request for a data object from application center 530-1, data persistence cache server 520-1 may determine if it has the data object stored. If it does, data persistence cache server 520-1 may send the data object to application center 530-1, which may, in turn, send the data object to client 540-1. Upon the application center receiving the data object, it may store the data object to be able to satisfy requests from the same or a different client for the same data object at a future time. Application center 530-1 may make a determination as to whether the data object should be stored or not. For example, the determination may be based on the frequency it is receiving requests for the data object from clients 540. If the data object is frequently being requested by clients 540, application center 530-1 may store the data object. This may only occur if the data object is being requested more frequently than some other data objects. For example, only the 10,000 most frequently requested data objects may be stored by the application center. In some embodiments, application center 530-1 may store the most recently requested data objects. Therefore, this data object would be stored at application center 530-1, and possibly some other data object would no longer be stored at application center 530-1. In some embodiments, different application centers use different mechanisms to determine what data objects to store. Also, in some embodiments, some data objects are always stored at application centers 530. This may occur if a particular data object has been labeled a "high priority" (or some equivalent thereof).

However, if data persistence cache server 520-1 determines that it does not have the data object requested by client 540-1 stored, data persistence cache server 520-1 may contact another server. Data persistence cache server 520-1 may contact another server called a data object origin server 510. Data object origin server 510 may supply data persistence cache servers 520 with various data objects. In cloud data persistence system 500-1, data object origin server 510 is shown as communicating with two data persistence cache servers 520. However, it should be understood that data object origin server 510 may communicate with one, three, or some other number of data persistence cache servers. For example, data object origin server 510 may communicate with more, such as 20 data persistence cache servers.

Data object origin server 510 may be physically located with one or more data persistence cache servers. Data object origin server 510 may communicate directly, such as via a direct connection, with data persistence cache servers. For example, in cloud data persistence system 500-1, data object origin server 510 communicates directly with the data persistence cache server 520-2. Data object origin server 510 may also communicate via any of the previously mentioned networks with a data persistence cache server. Again, referring to cloud data persistence system 500-1, data object origin server 510 communicates with data persistence cache server 520-1 via a network, possibly the Internet.

While application centers 530 and data persistence cache servers 520 may store only a subset of the various data objects that clients 540 may request, data object origin server 510 may store all data objects that exist on system 500-1. In other words, if a data object requested by a client is not present on data object origin server 510, the data object may not exist on system 500-1.

Just as a data persistence cache server may be physically located near a group of application centers, data object origin server 510 may be located near the group of data persistence cache servers 520. Returning to the previous regional example, if a data persistence cache server is located in New England, another may be located near New York City, another near Washington D.C., and perhaps yet another near Chicago. If one data object origin server is servicing these data persistence cache servers, it may be located in a central location to serve them all. In some embodiments, the data object origin server may be co-located with one or more data persistence cache servers. Alternatively, a data object origin server may be located at a separate physical location from any other database servers.

A request from the data persistence cache server 520-1 to data object origin server 510 may comprise a URI. This may be the same URI that was sent from client 540-1 to application center 530-1, then from application center 530-1 to data persistence cache server 520-1. In some embodiments, the URI transmitted from data persistence cache 520-1 may be in a different format than the other URIs. Upon receiving the URI, data object origin server 510 may locate the data object the URI is linked to. The data object origin 510 may then transmit the data object to data persistence cache server 520-1. The data persistence cache server 520-1 may make determination as to whether to store the data objects as previously described in relation to application center 530-1. For example, the determination of whether to store the data object may be based on the frequency with which application centers 530 request the data object from data persistence cache server 520-1. In some embodiments, data persistence cache server 520-1 stores the most recently requested data objects. Data persistence cache server 520-1 may then transmit the data object to application center 530-1. Application center 530-1 may then transmit the data object to client 540-1.

If the data object was first found at application center 530-1, the latency between client 540-1's request and client 540-1 receiving the data object may be the shortest. If instead the data object is first found at data persistence cache server 520-1, the latency may be longer. Finally, if the data object is only found at data object origin 510, the latency may be the longest. Regardless of where the data object is found, client 540-1 may be unaware of whether application center 530-1, a data persistence cache server 520-1, or the data object origin server 510-1, had the data object stored.

While only one data object origin server 510 is present in cloud data persistence system 500-1, more than one data object origin server is possible. For example, a data object origin server may serve a particular region, such as a country. Other data object origin servers may be present in other countries. These data object origin servers may each maintain identical or substantially similar data sets. Therefore, a data object found on one data object origin server would also be found on other data object origin servers. While not illustrated in FIG. 5, it should be understood that data object origin server 510 may be in communication with a kernel server and/or a data object updater server, such as illustrated in FIGS. 2A, 2B, and 4. Such an arrangement may allow multiple different data object origin servers to have the same data objects stored.

While the above deals with the communication flow in cloud data persistence system 500-1 when a client requests a data object, a client (or, of course, an end user acting through the client) may also modify a data object. Depending on the data object, a request for a particular data object may be much more frequent than a request to modify a data object. By way of example only, consider a video clip posted on an online video sharing website. If the video is popular, data object information, such as the video owner's name and the video's title may be sent to millions of different clients. However, the end user who created the video may only infrequently modify (via a client) data linked to the video.

In cloud data persistence system 500-1, the request to modify a data object, as opposed to a request to retrieve a data object, may be treated differently. If client 540-1 makes a request to application center 530-1 to modify a data object, application center 530-1 (assuming the end user and/or client has the proper permissions to modify the data object) may route the request to Kernel application center 111. Kernel application center 111 may then update data object origin server 510, and any other data object origin servers requiring updating. Application center 530-1 may not modify or delete the previous version of the data object if it is stored at application center 530. The data object may then be updated at data object origin server 510. While the data object may now be updated at data object origin server 510, other application centers and data persistence cache servers, such as application center 530-3 and data persistence cache 520-1, may still have out-of-date versions of the data object. Therefore, upon receiving the modifications to the data object, kernel application center 111 may notify data persistence cache servers 520 to no longer use their current version of the data object. This may involve data persistence cache servers 520 deleting their out-of-date version of the data object. In turn, data persistence cache servers 520 may notify application centers 530 to similarly no longer use their out-of-date versions of the data object. This may again involve the out-of-date data object being deleted from application centers 530. Application centers 530 and data persistence cache servers 520 may not receive a new version of the data object along with the notification. Rather, application centers 530 and data persistence cache servers 520 may only receive the new version of the data object if a client requests the data object and it is routed through the data persistence cache server and the application center.

If kernel application center 111 knows what particular data objects are stored at data persistence cache servers 520, a notification may only be sent to the data persistence cache server known to store the data object. Similarly, if data persistence cache servers 520 know what data objects are stored at application centers 530, only those application centers that have out-of-date versions of the data object may be sent the notification. In some embodiments, whenever a modification of a data object is received at kernel application center 111, all data persistence cache servers 520 are notified, which in turn notify all application centers 530. In such embodiments, therefore, kernel application center 111 does not need to be aware of what particular data objects are stored at data persistence cache servers 520, and data persistence cache servers 520 do not need to be aware of what data objects are stored at application centers 530. In some embodiments, Kernel application center 111 notifies both data persistence cache servers 520 and application centers 530.

Figure 5B:
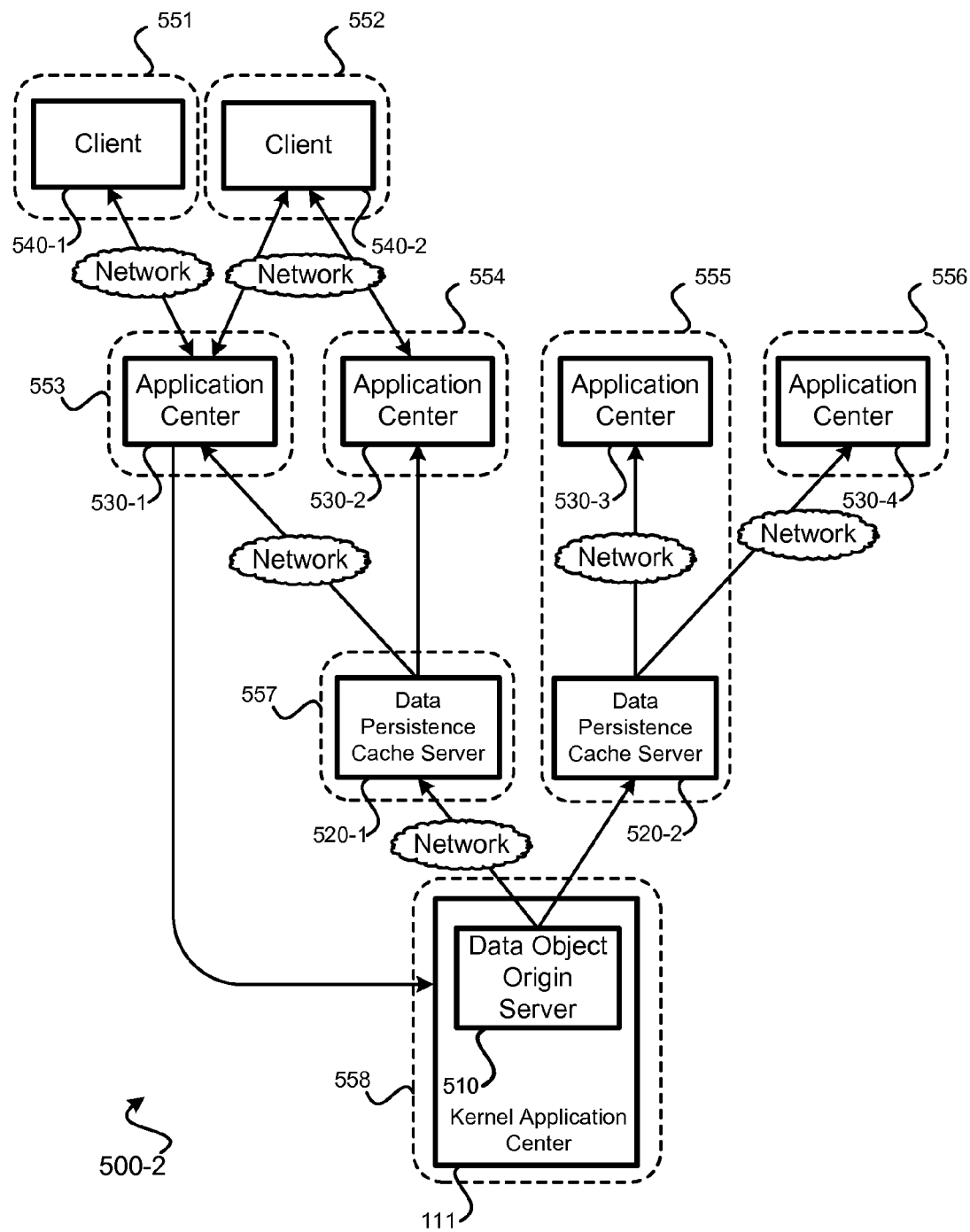
FIG. 5B illustrates another simplified block diagram of an embodiment of a cloud data persistence system.

Referring to FIG. 5B, a simplified block diagram of an embodiment of a cloud data persistence system 500-2 is illustrated. Such a system may be substantially similar to system 500-1. However, system 500-2 illustrates how various components of system 500-2 may be geographically separated. It should be understood that each component of system 500-2 may be located at a different physical location. In some embodiments, client 540-1 is at location 551 while client 540-2 is at location 552. Locations 551 and 552 may be close together, possibly only several miles if both client 540-1 and client 540-2 are using the same application center. Clients 540-1 and 540-2 may be a great distance apart if they are using different application centers.

Application centers 530-1, 530-2, 530-3, and 530-4 are shown as different locations of 553, 554, 555, and 556, respectively. Application centers that use the same data persistence cache server may be closer together than application centers that do not use the same data persistence cache servers. Further, as those with skill in the art will recognize, while an application server may not be physically closer to a data persistence cache server, due to the state of the network, communication between two physically further apart servers may be quicker. In such a case, the further servers may be in communication as opposed to the closer servers.

Data persistence cache server 520-1 is at another location 557. Location 557 may be near or in between location 553 and 554. Data persistence cache server 520-2 is at the same location 555 as application center 530-3. In some embodiments, data persistence cache server 520-2 is at some other location from application center 530-3. Finally, data object origin server 510 may be present at location 558. This location may be at the kernel application center 111, or may be separate.

Figure 6:
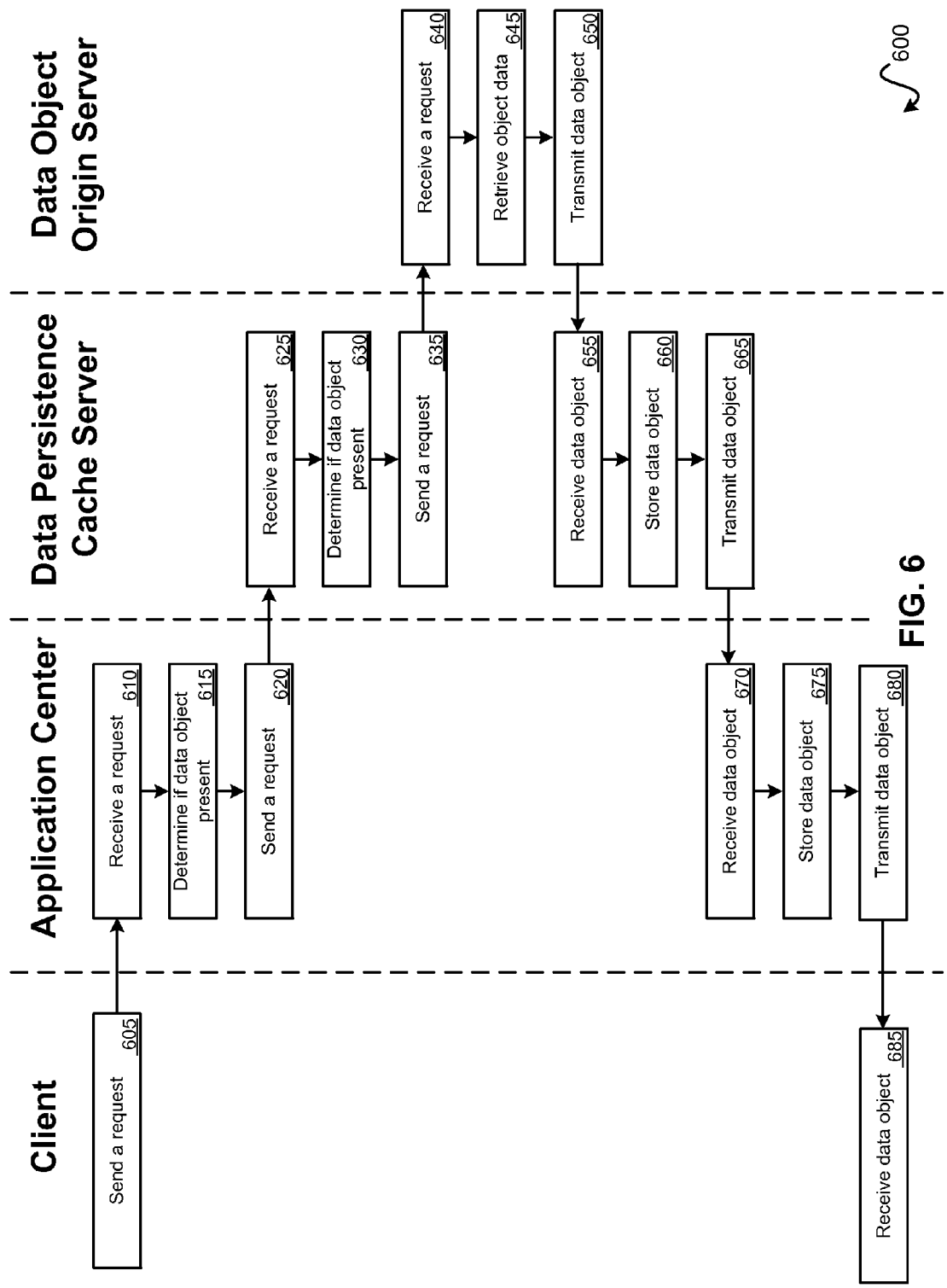
FIG. 6 illustrates a simplified swim diagram of an embodiment of a method for responding to a client request to retrieve a data object from a cloud data persistence system.

FIG. 6 illustrates a simplified swim diagram of an embodiment of a method 600 for responding to a client request to retrieve a data object. Such a method may use a cloud data persistence system, such as cloud data persistence system 500-1 of FIG. 5A. Alternatively, method 600 may rely on some other cloud data persistence system. The embodiment of FIG. 6 presupposes that the data object requested is not present on either the application center contacted or the cache server contacted. As described in relation to FIG. 5, if one of those servers has the data object stored, the method would differ.

At block 605, a request may be sent from a client to an application center. The client may be client 540-1 or 540-2 of FIG. 5, or may represent some other client. Similarly, the application center of FIG. 6 may represent any of application centers 530 of FIG. 5, or may represent some other application center. The request sent by the client at block 605 of FIG. 6 may contain a URI, possibly a URL, indicating the data object the client is requesting to retrieve. The request may be received either directly or via a network (such as the Internet), by the application center at block 610.

At block 615, the application center may determine if the data object requested by the client is present. This may involve the application center searching a storage device, such as a hard drive or solid state drive for the data object. In some embodiments, the application center may search an index of all the data objects it has stored. In this embodiment, the application center does not have the data object stored locally. Therefore, at block 620, a request is sent from the application center to a data persistence cache server. This request may contain the same URI received in the request from the client at block 610. The cache server contacted may be a data persistence cache server 520 of FIG. 5A or may represent some other data persistence cache server. The request by the application center may be received by the data persistence cache server either directly or via a network (such as the Internet) at block 625.

At block 630, the data persistence cache server may determine if the data object requested by the application center is present. This may involve the data persistence cache server searching a storage device, such as a hard drive or solid state drive for the data object. In some embodiments, the data persistence cache server may search an index of all the data objects it has stored. In this embodiment, the data persistence cache server does not have the data object stored locally. Therefore, at block 635, a request is sent from the data persistence cache server to an data object origin server. This request may contain the same URI received in the request from the client at block 610 and the application center at block 625. The data object origin server contacted may be the data object origin server 510 of FIG. 5A or may represent some other data object origin server. The request by the data persistence cache server may be received by the object origin server either directly or via a network (such as the Internet) at block 640.

At block 645, the data object origin server may locate the data object requested. Assuming that the URI indicating the data object initially requested by the client is valid, the object origin server should have the data object stored. If the data object is not present at the data object origin server, the data object may be assumed to not exist or that the URI submitted by the client is incorrect. To retrieve the data object, the data object origin server may search one or more local (or remote) hard drives or solid state drives for the data object. In some embodiments, the data object origin server uses an index to locate and retrieve the data object. Once the data object has been located, at block 650 it may be transmitted to the data persistence cache server.

At block 655, the data persistence cache server may receive the data object. The data received from the data object origin server may also include the URI sent in the request at block 635. At block 660, the data persistence cache server may determine whether the data object should be stored locally. If the data persistence cache server stores the most recent data objects requested, the data persistence cache server may always store the data object when it is received from the data object origin server. If the data persistence cache server stores only the most frequently requested data objects, the data object may not be stored if other data objects are requested more frequently. As those with skill in the art will understand, there are other factors that may be used to determine whether the data object is stored locally at the data persistence cache server. As another example, the decision as to whether to store the data object may be based partially on frequency of requests for the data object and partially on the data object being recently requested. Whether the data object is stored or not, it may be transmitted to the application center at block 665.

At block 670, the application center may receive the data object. This may be the same application center that received the request at block 610. The data received from the data persistence cache server may also include the URI sent in the request by the application center at block 620. At block 675, the application center may determine whether the data object should be stored locally. The factors used to consider whether to store the data object may be the same or different from the factors used at the data persistence cache server. Again, if the application center stores the most recent data objects requested, the application center may always store data objects received from the data persistence cache server. If the application center stores only the most frequently requested data objects, the data object may not be stored if other data objects are requested by clients more frequently. As those with skill in the art will understand, there are other factors that may be used to determine whether the data object is stored locally at the application center. As another example, the decision as to whether to store the data object may be based partially on the frequency of requests for the data object and partially on the data object being recently requested. Whether the data object is stored by the application center or not, it may be transmitted to the client at block 680. Further, to be clear, while it is possible that the same data objects may be stored at both the application and the data persistence cache server, it is likely that at least some different data objects would be stored at the application center than the data persistence cache server. Also, the amount of storage available at the application center and the data persistence cache server may vary. For example, the data persistence cache server may have 50% more storage space than an application center; therefore, it may store roughly 50% more data objects.

At block 685, the client may receive the data object it requested at block 605. The client may be unaware as to whether the data object was present at the application center, the data persistence cache server, or the data origin cache server. To the client, it may appear as if the client is only interacting with the application center.

Figure 7:
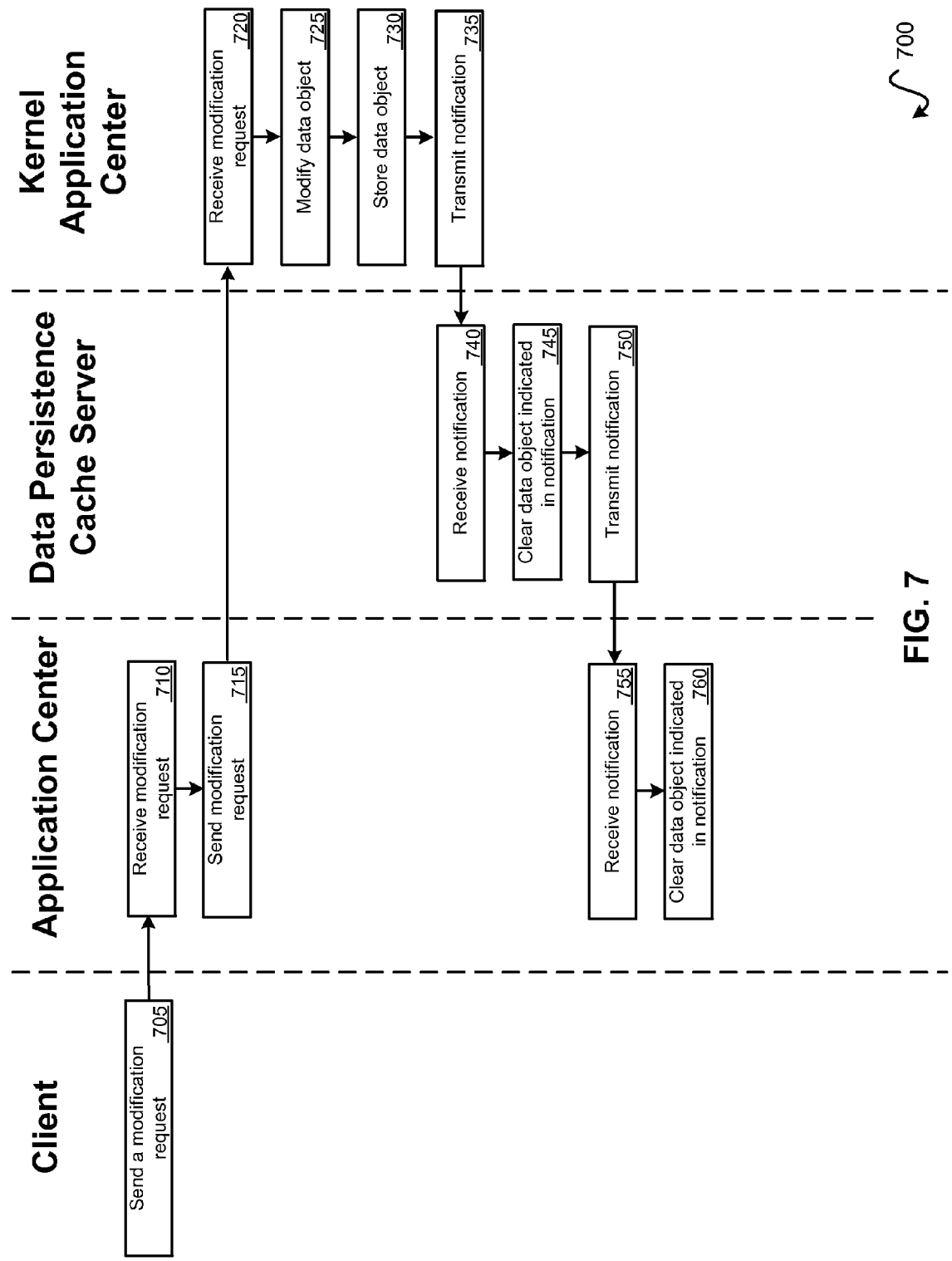
FIG. 7 illustrates a simplified swim diagram of an embodiment of a method for responding to a client request to modify a data object on a cloud data persistence system.

While FIG. 6 illustrates an embodiment of a method of a client requesting a data object, assuming the associated end user and/or client has the proper permissions, the end user and/or client may also request to modify a data object. FIG. 7 illustrates a swim diagram of a simplified embodiment of a method 700 of a client modifying a data object. Method 700 may be conducted using a cloud data persistence system, such as cloud data persistence system 700 of FIG. 7. Alternatively, some other cloud data persistence system may be used. A modification may involve changing data within a data object, adding data to a data object, or deleting the data object, to name only a few examples. It should be understood that in some embodiments, modifications to data objects are much less frequent than requests to retrieve a data object. At block 705, the client may transmit the request to modify the data object to an application center. The client may be the same client as detailed in FIG. 6 or client 540-1 or 540-2 of FIG. 5. Alternatively, the client of FIG. 7 may represent some other client. Similarly, the application center of FIG. 7 may represent the application center of FIG. 6 or any of application centers 530 of FIG. 5. The application center of FIG. 7 may also represent some other application center.

At block 710, the application center may receive the modification request from the client. The request may include a URI (such as a URL) indicating the data object the client is attempting to modify. The request may also include the changes, additional information, or an indication to delete the data object. If the application center determines it has the data object stored, at block 712, the application center may delete or block access to the data object so that other clients do not receive an out-of-date version of the data object. At block 715, a modification request may be transmitted from the application center to the data object origin server. This transmission may be routed from the application to the data object origin server (e.g., not through the data persistence cache server) or may be relayed by the data persistence cache server.

At block 720, the kernel application center may receive the modification request. The kernel application center may be the kernel application center 111 of FIG. 5A and FIG. 5B. Kernel application center of FIG. 7 may also represent a data object origin server. After receiving the modification request at block 720, the kernel application center may modify the data object at one or more data object origin servers at block 725. Data object origin servers may always have a stored version of the data object because they maintain a stored version of all valid data objects. If the data object origin server does not have a version of the data object requested to modify, it may be assumed that the data object does not exist or the URI sent by the client at block 705 was incorrect. The modification at block 725 may involve the data object being changed, having data added to it, or the data object being deleted. At block 730, the modified data object may be stored at one or more data object origin servers. Obviously, if the data object is being deleted, this step may not occur.

At block 735, a notification may be sent by the kernel application center that indicates that the data object has been modified. Of note, this modification may not contain the modified data object, but rather may contain only information that indicates that previous versions of the data object are no longer valid. This notification may be transmitted to one or more data persistence cache servers at block 735. While the swim diagram illustrates the notification being sent to only one data persistence cache server, this is for simplicity only. The notification transmitted by the data object origin server may be sent to all data persistence cache servers (or those data persistence cache servers that have the previous version of the data object stored) in communication with the data object origin server. The notification may only be sent to those data persistence cache servers that have an out-of-date version of the data object if the kernel application center is aware of which data persistence cache servers have the data object stored. This may be possible if the data persistence cache server informs the kernel application center of its stored data objects. Alternatively, all data persistence caches may receive the notification whether they have the previous version of the data object stored or not. If a data persistence cache server does not have the previous version of the data object stored, the data persistence cache server may ignore the notification.

At block 740, the notification may be received by the data persistence cache server. The data persistence cache server may be the data persistence cache server of FIG. 6 and/or one of the data persistence cache servers 520 of FIG. 5. The data persistence cache server of FIG. 7 may represent some other data persistence cache server. At block 745, the previous version of the data object may be cleared (e.g., deleted or otherwise removed) from the data persistence cache server. At block 750, a notification that the previous version of the data object is out-of-date may be transmitted to one or more application centers at block 750.

While the swim diagram illustrates the notification being sent to only one application center, this is for simplicity only. The notification transmitted by the data persistence cache server may be sent to all application centers (or those application centers that have the previous version of the data object stored) in communication with the data persistence cache server. The notification may only be sent to those application centers that have the previous version of the data object if the data persistence cache server is aware of which application centers have the previous version of the data object stored. This may be possible if the application center informs the data persistence cache server (or the kernel application center and/or data object origin server) of its stored data objects. Alternatively, all application centers may receive the notification whether they have the previous version of the data object stored or not. If an application center does not have the previous version of the data object stored, the application center may ignore a received notification. The notification sent by the data persistence cache server at block 740 may represent the same or a similar notification as sent by the kernel application center at block 735. For example, the notification may include a URI (possibly a URL) indicating the data object that has been modified. At block 760, the previous version of the data object may be cleared (e.g., deleted or otherwise demarked) from the application center.

Figure 8:
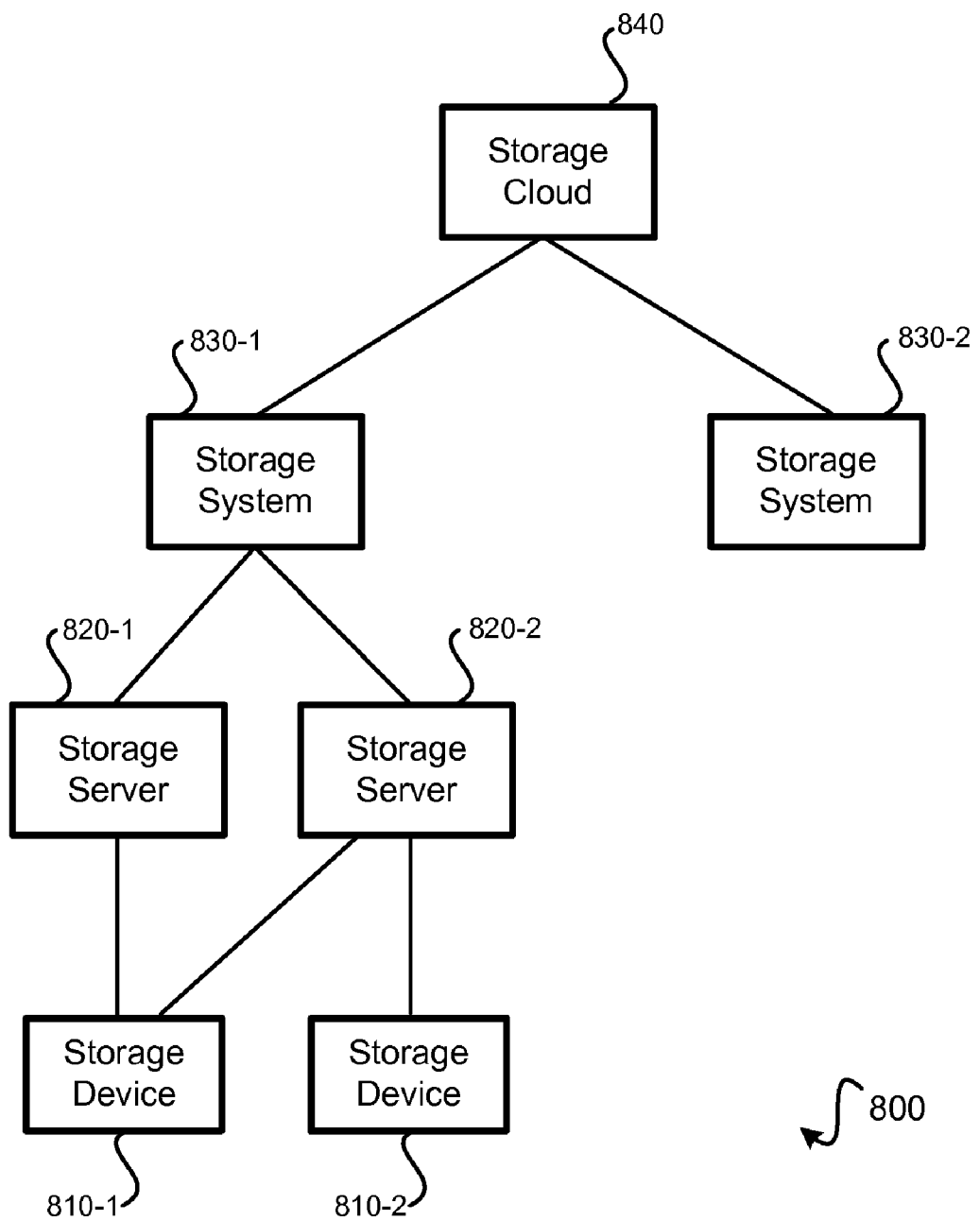
FIG. 8 illustrates a simplified block diagram of an embodiment of an asset management and storage system.

While the previous description and figures relate to how a client may retrieve and modify a data object, the storage of data objects and other data and/or files may be more sophisticated than one server (e.g., an application center, a data persistence cache server, or a data object origin server) having one or more storage devices. For example, each application center of FIG. 5A may represent a cluster of servers, each connected to one or more storage devices, such as hard drives or solid state drives. FIG. 8 illustrates a simplified block diagram of an embodiment of an asset management and storage system 800 showing how various storage devices may be used to store data and accessed. While such a system may be used to store data objects, such as those data objects described previously, such a system may be used to store other forms of electronic data, such as media assets. A media asset may be a media file, such as a movie file, audio file, or image file.

In system 800, multiple different storage devices 810 may be present. These storage systems may be servers having storage devices such as hard drives and/or solid state drives. Storage devices 810-1 and 810-2 may be located in the same location or may be physically in different locations. Each of storage devices 810 may be linked to one or more storage servers 820. These storage servers 820 may not be physical servers, but rather logical abstractions of servers. Alternatively, they may be physically separate servers. Various storage drives on storage servers 820 may be mapped to different storage devices. For example, storage server 820-1 is linked to one storage drive. The storage drive is present on storage device 810-1. Storage server 820-1 and storage device 810-1 may be directly connected, or may be connected via a network, such as the Internet or a private corporate intranet. In system 800, storage server 820-2 has two storage drives. A first storage drive of storage server 820-2 maps to storage device 810-1. Therefore, in the embodiment of the system 800, storage device 810-1 is mapped to two different storage servers. If, for example, storage device 810-1 has storage totaling 1 TB, this gross storage space may be divided among the two drives mapped to it. For example, the storage drive of storage server 820-1 mapped to storage device 810-1 may be 300 GB. And, the storage drive of storage device 820-2 mapped to storage device 810-1 may be 700 GB. Storage server 820-2 may also have another storage drive. The storage drive is mapped to storage device 810-2. In this embodiment, storage device 810-2 is only mapped to storage server 820-2. Therefore, if storage device 810-2 has total storage of 2 TB, this entire space may be mapped to the linked storage drive of storage server 820-2. Or, as another example, only 800 GB of storage device 810-2 may be mapped to storage server 820-2, with the remaining space being free space.

Also, different storage devices may require communication, such as requests for media assets, to use varying protocols. For example, storage device 810-1 may be configured to accept file requests via FTP. However, storage device 810-2 may use MICROSOFT WINDOWS's file copy. It should also be understood that other protocols may also be used. Therefore, depending on what protocol a storage device accepts, the storage server links to that storage device may be configured to communicate in the proper protocol. This may be especially useful if the entity operating the storage servers 820 does not control one or more of storage devices 810. For example, storage device 810-2 may be maintained by some other entity, such as a client of the entity operating system 800.

Other logical abstractions that may be present are storage systems 830. Each storage system, such as storage system 830-1, may contain one or more than one storage servers 820. In system 800, storage system 830-1 includes two storage servers: 820-1 and 820-2. Therefore, a request for a particular piece of data, such as a media asset, received at storage system 830-1, may not indicate the storage server or the storage device where the media asset is located. However, upon receiving the request (possibly in the form of a URL) at storage system 830-1 for the media asset, it may be able to determine the appropriate storage server to contact. In turn, this storage server may be able to determine the appropriate storage drive (linked to a storage device) that contains the media asset. The logical abstractions of the storage system 830 and storage servers 820 may reside on the same physical servers as storage devices 810. In some embodiments, storage server 820 and storage system 830 are present on different servers than storage device 810. Also, storage systems 830 may be physically separate servers from storage servers 820.

Yet another logical abstraction may be present as storage cloud 840. Storage cloud 840 may include one or more storage systems. Storage cloud 840 may be viewed as the entire storage system. In system 800, storage cloud 840 includes storage systems: 830-1 and 830-2. Therefore, storage cloud 840 may contain all storage systems 830 in system 800. In turn, storage systems 830 may contain all storage servers 820 in system 800. Further, storage server 820 may be linked to all storage devices 810 in system 800.

Figure 9:
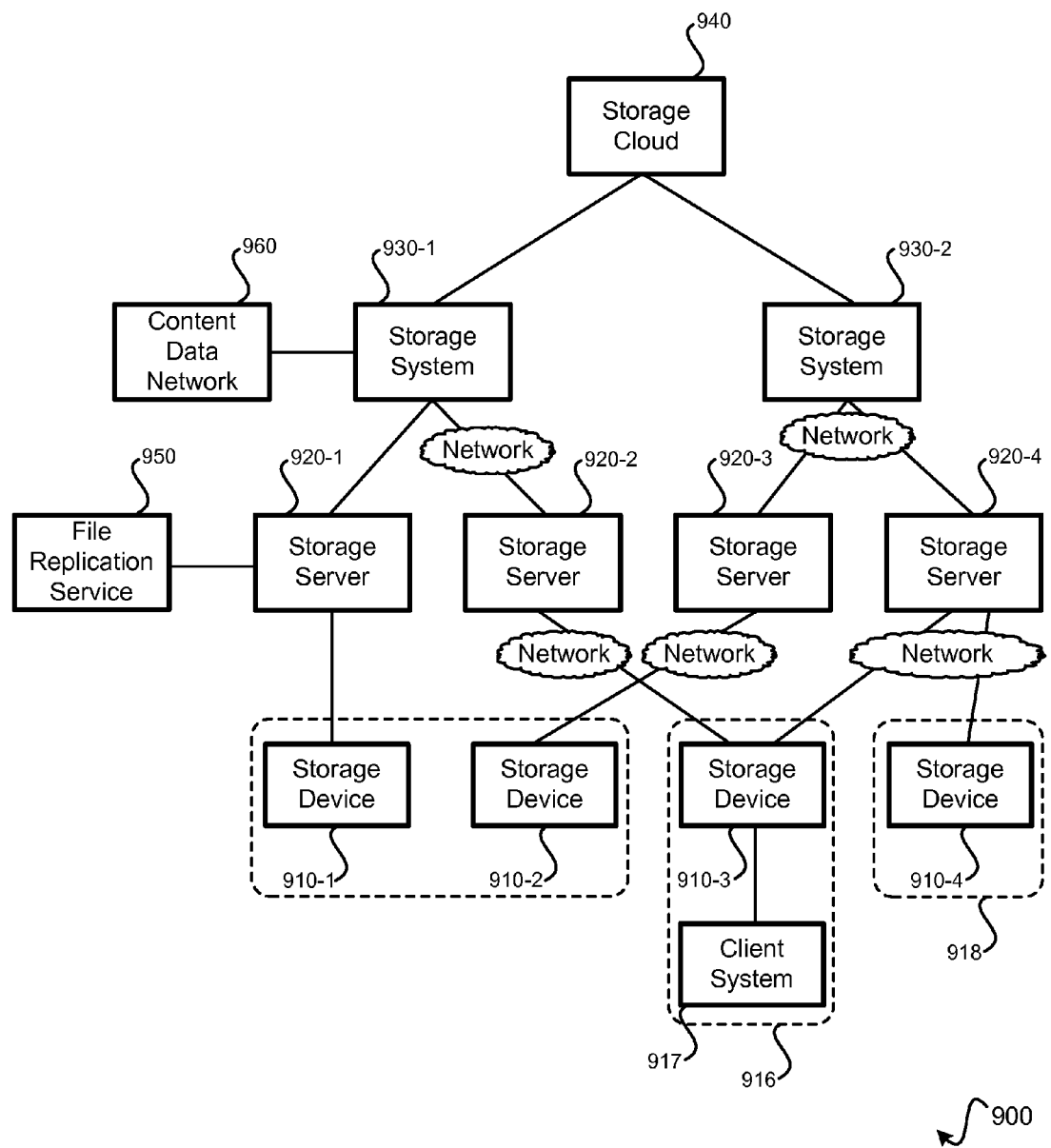
FIG. 9 illustrates another simplified block diagram of an embodiment of an asset management and storage system.

FIG. 9 illustrates another simplified block diagram of an embodiment of a system 900 showing how various storage devices may be accessed. System 900 of FIG. 9 may represent the same system as system 800 of FIG. 8, or may represent a different system. In the embodiment illustrated, system 900 contains four storage devices: 910-1, 910-2, 910-3, and 910-4. These storage devices may represent any of storage devices 810 of FIG. 8. Also, these storage devices may represent different storage devices. As will be understood to those with skill in the art, fewer or more storage devices may also be possible. In the illustrated embodiment, storage device 910-1 and storage device 910-2 are illustrated as being operated by first entity 915. First entity 915 may be the entity that operates other portions of system 900, or is a client of the entity that operates other portions of system 900. These storage devices, 910-1 and 910-2, may be co-located with one or more storage servers 920, or may be geographically separated. Further, storage device 910-1 and storage device 910-2 may be present at the same location, or may be geographically separated. Storage device 910-3 may be operated by a second entity 916. In some embodiments, the second entity 916 may be a client of the first entity. In system 900, storage device 910-3 may communicate with other systems 917 of the second entity 916. Therefore, while storage servers 920 may be able to access storage device 910-3, client system 917 may also access and/or modify data stored on storage device 910-3. Storage device 910-4 is illustrated as part of a third entity 918. This entity may be an entity that sells or leases storage on their system. While FIG. 9 illustrates four storage devices operated by various entities, those skilled in the art will recognize that this arrangement is merely for exemplary purposes. Many other arrangements of storage devices, operated by one or more entities may be possible.

Whether operated by three different entities, as illustrated, or by one entity, storage devices 910 may communicate with multiple storage servers 920. System 900 includes four storage servers: 920-1, 920-2, 920-3, and 920-4. The storage servers 920, which may be logical abstractions, may communicate with the various storage devices 910 via a direct connection (such as 920-1 to storage device 910-1) or via a network (such as 920-2 to storage device 910-3). The network may be a network such as the Internet or a private corporate intranet. One storage server may be mapped to one storage device, for example, in FIG. 9, storage server 920-1 only has one storage drive mapped to storage device 910-1. A storage device may also be mapped to multiple storage servers, for example, in FIG. 9, storage servers 920-2 and storage server 920-4 are both mapped to storage device 910-3. Also, one storage server may be mapped to multiple storage devices. For example, storage server 920-4 is mapped to storage device 910-3 and storage device and 910-4.

Also, storage servers 920 may communicate with storage devices 910 via a variety of different protocols. For example, the format of requests to some storage devices may be FTP, while others may be MICROSOFT WINDOWS file copy. Other protocols may also be possible. Therefore, any request for data or a media asset that is received by storage servers 920 does not need to indicate the appropriate protocol to retrieve the file or media asset from the appropriate storage device.

As in FIG. 8, one or more than one storage servers may be mapped to a storage system 930. Storage systems 930 may represent the same storage systems as storage systems 830 of FIG. 8. Alternatively, storage systems 930 may represent some other storage systems. In system 900 of FIG. 9, storage servers 920-1 and storage server 920-2 are mapped to storage system 930-1. Storage system 930-1 may communicate directly with the storage server (such as the connection between storage system 930-1 and storage server 920-1) or may use a network (such as the connection between storage system 930-1 and storage server 920-2). In system 900, storage system 930-2 may communicate with two storage servers: 920-3 and 920-4. While in system 900 storage systems 930 are shown as communicating with two storage servers each, those with skill in the art will recognize that a storage system may also communicate with one or more than two storage servers.

Storage systems 930 may make up storage cloud 940. Storage cloud 940 may represent the same storage cloud as storage cloud 840 of FIG. 8. Alternatively, storage cloud 940 may represent some other storage cloud. Therefore, storage cloud 940 may be viewed as including storage systems 930, storage servers 920, and storage devices 910.

Other systems may interact with various components of storage cloud 940. For example, a content data network 960 may communicate with storage system 930-1. If the client requests the media asset from content data network 960 (CDN) that the CDN does not have stored (a cache miss), the content data network 960 may request the media asset from storage system 930-1. Storage system 930-1 may then contact the appropriate storage server 920, which may, in turn, retrieve the media asset via the correct protocol from the appropriate storage device. From the viewpoint of CDN 960, it may appear that the media asset is stored at storage system 930-1. While CDN 960 is shown only interacting with storage system 930-1, it should be understood that this is for simplicity only. Multiple CDN's may communicate with storage system 930-1. Further, CDN's may also communicate with storage system 930-2.

While CDN 960 may communicate with storage system 930-1, file replication service 950 may communicate directly with storage servers 920. File replication service 950 may be responsible for distributing various media assets to storage server 920 that need to be stored for possible future retrieval. While file replication service 950 is shown as connected to only storage server 920-1, it should be understood that file replication service 950 may be in communication with multiple storage servers 920. Besides file replication service 950, other services may interact directly with storage server 920.

Figure 10:
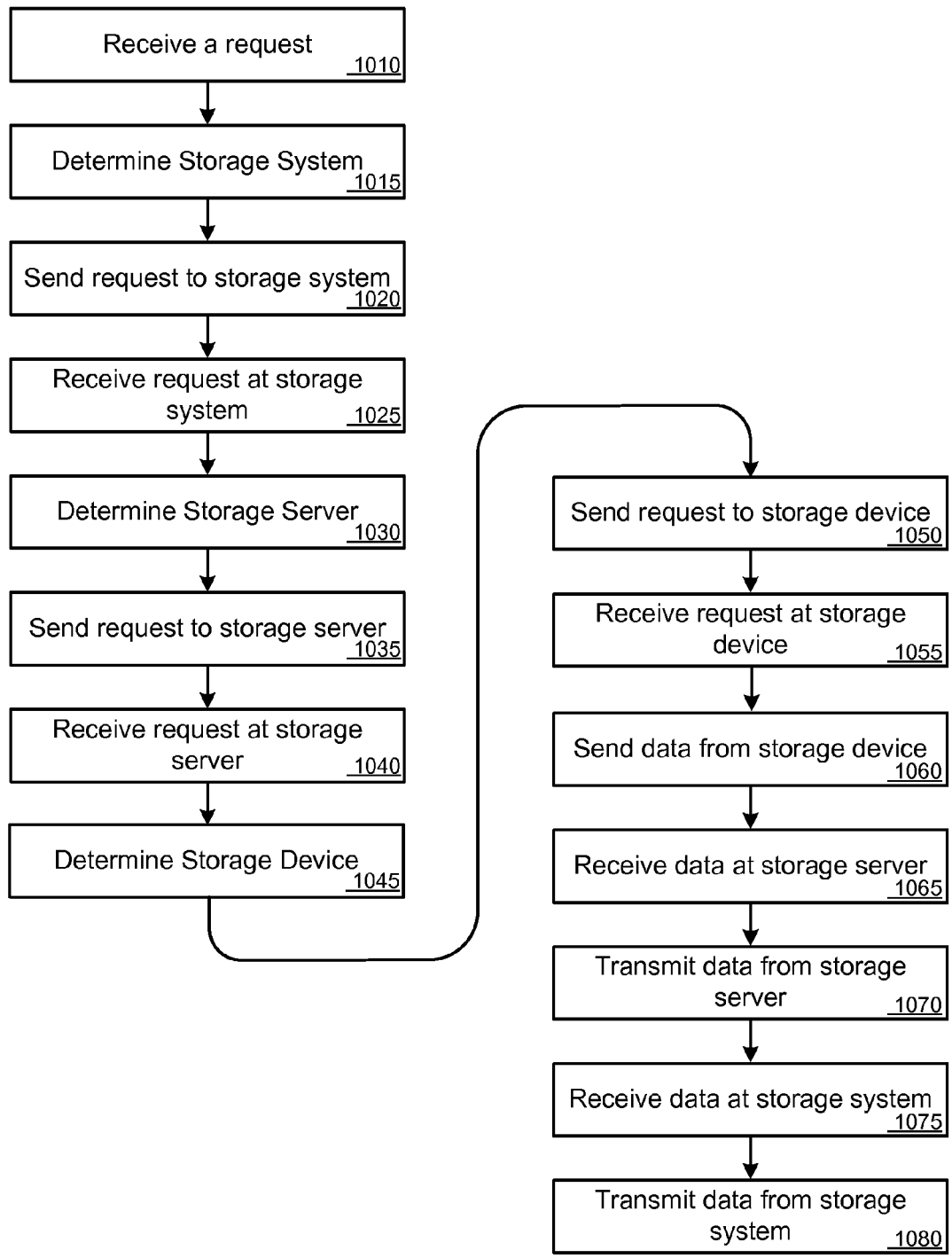
FIG. 10 illustrates an embodiment of a method for retrieving data from an asset management and storage system.

FIG. 10 illustrates a simplified embodiment of a method for retrieving data (such as a media asset) from a storage cloud system. Such a method may be used in conjunction with a storage cloud system such as system 800 of FIG. 8, or system 900 of FIG. 9. The method 1000 may also be used in conjunction with some other storage cloud system. At block 1010, a request may be received for a piece of data, such as a media asset. Such a request may be received from an entity such as a content data network or some other entity accessing the storage cloud.

At block 1015, if the storage cloud contains more than one storage system, the appropriate storage system that contains the data requested may be identified. At block 1020, a request for the data may be sent to the appropriate storage system. At block 1025, the request may be received at the appropriate storage system. At block 1030, the storage system may determine the appropriate storage server that stores the data requested. Such a determination may involve an index being searched by the storage system to determine which storage server to contact. If the storage system only has one link to a storage server, such a determination may not be necessary. At block 1035, the request for the data may be sent to the appropriate storage server. This request may be received by the storage server at block 1040. At block 1045, a storage server may determine the appropriate storage device that stores the requested data. This step may not be necessary if only one storage device is linked to the storage server. At block 1050, the storage server may send a request for the data to the appropriate storage device. This request may be formatted using the appropriate protocol for the storage device receiving the request.

At block 1055, the request may be received at the appropriate storage device in the appropriate protocol. The storage device may then retrieve the appropriate data. At block 1060, the requested data may be transmitted from the storage device and received at the storage server at block 1065. The storage server may then transmit the requested data at block 1070, the requested data is then received by the storage system at block 1075. At block 1080, the requested data may be transmitted from the storage system to the requesting party, in this case the CDN.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A cloud data persistence system for distribution of data, the cloud data persistence system comprising:

a first server which stores a first plurality of data objects and is communicatively coupled with a plurality of cache servers, wherein:
the first server is located at a first location;
each of the first plurality of data objects comprise a link to one of a plurality of media assets; and
the plurality of media assets are stored at a second location separate from the first location;

a second server that stores a second plurality of data objects and is configured to request a data object from the first server if the data object is not present in the second plurality of data objects, wherein:
the second server is one of the plurality of cache servers; and
the second server is communicatively coupled with a first plurality of application servers;

a third server that stores a third plurality of data objects and is configured to request the data object from the first server if the data object is not present in the third plurality of data objects, wherein:
the third server is one of the plurality of cache servers; and
the third server is communicatively coupled with a second plurality of application servers; and a fourth server that stores a fourth plurality of data objects and is configured to request the data object from the second server if the data object is not present in the fourth plurality of data objects, wherein:
the fourth server is one of the first plurality of application server; and the fourth server is configured to receive a request from a first client for the data object;
a fifth server that stores a fifth plurality of data objects and is configured to request the data object from the second server if the data object is not present in the fifth plurality of data objects, wherein:
the fifth server is one of the first plurality of application servers; and
the fifth server is configured to receive a request from a second client for the data object;
a sixth server that stores a sixth plurality of data objects and is configured to request the data object from the third server if the data object is not present in the sixth plurality of data objects, wherein:
the sixth server is one of the second plurality of application servers; and
the sixth server is configured to receive a request from a third client for the data object; and
a seventh server that stores a seventh plurality of data objects and is configured to request the data object from the third server if the data object is not present in the seventh plurality of data objects, wherein:
the seventh server is one of the second plurality of application servers; and
the seventh server is configured to receive a request from a fourth client for the data object.

2. The cloud data persistence system of claim 1, wherein the second location comprises a content delivery network.

3. The cloud data persistence system of claim 1, wherein:
data objects in the second plurality of data objects are at least partially determined based on when requests for those data objects were last received at the second server;
data objects in the third plurality of data objects are at least partially determined based on when requests for those data objects were last received at the third server;
data objects in the fourth plurality of data objects are at least partially determined based on when requests for those data objects were last received at the fourth server;
data objects in the fifth plurality of data objects are at least partially determined based on when requests for those data objects were last received at the fifth server;
data objects in the sixth plurality of data objects are at least partially determined based on when requests for those data objects were last received at the sixth server; and
data objects in the seventh plurality of data objects are at least partially determined based on when requests for those data objects were last received at the seventh server.

4. The cloud data persistence system of claim 1, wherein the first plurality of data objects comprises all data objects in the second plurality of data objects, the third plurality of data objects, the fourth plurality of data objects, the fifth plurality of data objects, the sixth plurality of data objects, and the seventh plurality of data objects.

5. A cloud data persistence system for distribution of data, the cloud data persistence system comprising:
a first server which stores a first plurality of data objects and is communicatively coupled with a second server and a third server, wherein:
the first server is located at a first location;
each of the first plurality of data objects comprises a link to a media asset of a plurality of media assets;
the plurality of media assets is located at a second location; and
the second location is distinct from the first location;
the second server stores a second plurality of data objects and is configured to request a data object from the first server if the data object is not present in the second plurality of data objects, wherein the second server is communicatively coupled with a fourth server and fifth server; and
the fourth server stores a third plurality of data objects and is configured to request the data object from the second server if the data object is not present in the third plurality of data objects, wherein the fourth server is configured to receive a request from a first client for the data object.

6. The cloud data persistence system of claim 5 wherein the first plurality of data objects comprises all data objects present in the second plurality of data objects and the third plurality of data objects.

7. The cloud data persistence system of claim 5, wherein the third server stores a fourth plurality of data objects and is configured to request the data object from the first server if the data object is not present in the fourth plurality of data objects, wherein:
the third server and the second server are data persistence cache servers; and
the third server is communicatively coupled with a sixth and seventh server.

8. The cloud data persistence system of claim 5, wherein the fifth server stores a fifth plurality of data objects and is configured to request the data object from the second server if the data object is not present in the fifth plurality of data objects, wherein:
the fifth server and the fourth servers are application servers; and
the fifth server is configured to receive requests from a second client for the data object; and
the fifth server is geographically separated from the fourth server.

9. The cloud data persistence system of claim 5, wherein the request from the first client for the data object comprises a universal resource indicator.

10. The cloud data persistence system of claim 5 wherein each of the first plurality of data objects comprise a universal resource locator and a title linked to a media asset of the plurality of media assets.

11. The cloud data persistence system of claim 5, wherein data objects in the second plurality of data objects and the third plurality of data objects are at least partially determined based on a frequency of requests for those data objects received from clients.

12. The cloud data persistence system of claim 5, wherein data objects in the second plurality of data objects and the third plurality of data objects are at least partially determined based on when requests for those data objects were last received from clients.

13. The cloud data persistence system of claim 5, wherein the first plurality of data objects comprises all data objects in the second plurality of data objects, the third plurality of data objects, the fourth plurality of data objects, and the fifth plurality of data objects.

14. A method for retrieving data objects using a cloud data persistence system configured for distribution of data, the method comprising:
receiving, by an application center, a first request from a client for a data object, wherein:
the application center is one of a plurality of application centers that communicate with a plurality of clients;
the application center is located at a first location;
the data object comprises a link to a media asset; and the media asset is stored at a second location separate from the first location;
determining, by the application center, the data object is not stored among a first plurality of data objects stored at the application center;
transmitting, by the application center, a second request for the data object to a first cache server, wherein:
   the first cache server is communicatively coupled with the plurality of application centers; and
   the first cache server is one of a plurality of cache servers;
receiving, by the cache server, the second request for the data object;
determining, by the cache server, the data object is not stored among a second plurality of data objects stored at the cache server;
transmitting, by the cache server, a third request for the data object to an origin server, wherein the origin server is communicatively coupled with the plurality of cache servers;
receiving, by the origin server, the third request for the data object;
locating, by the origin server, the data object among a third plurality of data objects;
transmitting, by the origin server, the data object linked to the third request to the cache server;
receiving, by the cache server, the data object linked to the third request;
transmitting, by the cache server, the data object linked to the second request;
receiving, by the application center, the data object linked to the second request; and
transmitting, by the application center, the data object linked to the first request to the client.

15. The method of claim 14 further comprising, after receiving the first data object from the origin server, storing, by the cache server, the first data object.

16. The method of claim 14 further comprising, after receiving the first data object from the cache server, storing, by the application center, the first data object.

17. The method of claim 14 wherein the cache server is located at a third location.

18. The method of claim 14 wherein the first request for the data object comprises a universal resource indicator.

19. The method of claim 14, wherein data objects in the first plurality of data objects and the second plurality of data objects are at least partially determined based on when requests for those data objects were last received from clients.

20. The method of claim 14, wherein the third plurality of data objects comprises all data objects in the first and the second pluralities of data objects.

* * * * *